(12) United States Patent
Minar et al.

(10) Patent No.: US 12,505,130 B2
(45) Date of Patent: Dec. 23, 2025

(54) TRANSACTION TAGS FOR ENHANCED SEARCHING

(71) Applicant: Apple Inc., Cupertino, CA (US)

(72) Inventors: Michael A. Minar, Palo Alto, CA (US); Yiran Kang, Santa Clara, CA (US); Fadi S. Obeid, Santa Clara, CA (US); Rachel Reddy, Long Island City, NY (US); Rima Kakarla, Cupertino, CA (US); Anuj Chaudhary, Fremont, CA (US); Anish Doshi, South Barrington, IL (US); Julien Barlerin, San Francisco, CA (US); Michael Artemiw, San Jose, CA (US); Richard W. Heard, San Francisco, CA (US); Ashish C. Nagre, Sunnyvale, CA (US); Thomas J. Miller, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/939,627

(22) Filed: Sep. 7, 2022

(65) Prior Publication Data

US 2023/0095944 A1    Mar. 30, 2023

Related U.S. Application Data

(60) Provisional application No. 63/248,215, filed on Sep. 24, 2021.

(51) Int. Cl.
G06F 16/332    (2025.01)
G06F 16/353    (2025.01)
G06F 16/38     (2019.01)

(52) U.S. Cl.
CPC ........ *G06F 16/3322* (2019.01); *G06F 16/353* (2019.01); *G06F 16/38* (2019.01)

(58) Field of Classification Search
CPC .... G06F 16/3322; G06F 16/353; G06F 16/38; G06F 16/3338; G06F 16/338;
(Continued)

(56) References Cited

U.S. PATENT DOCUMENTS 6,915,307 B1    7/2005    Mattis et al.
7,668,821 B1 *  2/2010    Donsbach .......... G06Q 30/0631
                                                   707/765

(Continued)

FOREIGN PATENT DOCUMENTS

WO    2018000136 A1    1/2018

OTHER PUBLICATIONS

"International Search Report and Written Opinion," mailed Nov. 23, 2022 in International Application No. PCT/US2022/043092. 11 pages.

(Continued)

*Primary Examiner* — Evan Aspinwall
(74) *Attorney, Agent, or Firm* — Kilpatrick Townsend & Stockton LLP

(57) ABSTRACT

Enhanced searching at a user interface may be enabled by tagged transaction records. When a search query is received at the user interface, a user device may determine a set of suggested search queries. Selection of one of the suggested search queries causes the user device to provide a set of search results that are associated with each via at least one transaction tag defined by the selected suggested search query.

20 Claims, 20 Drawing Sheets

(58) Field of Classification Search
CPC ........... G06F 16/9032; G06F 16/90324; G06F 16/9532; G06F 16/24573; G06F 16/242; G06F 16/90335; G06F 16/907; G06F 16/908
USPC ........................................................ 707/767
See application file for complete search history.

(56) References Cited

U.S. PATENT DOCUMENTS

| | | | |
|---|---|---|---|
| 8,086,504 B1* | 12/2011 | Dicker | G06Q 30/0641 707/750 |
| 2007/0271528 A1 | 11/2007 | Park et al. | |
| 2008/0183757 A1* | 7/2008 | Dorogusker | H04W 4/185 |
| 2012/0130736 A1* | 5/2012 | Dunston | G06Q 10/10 705/2 |
| 2013/0024329 A1* | 1/2013 | Chang | G06Q 30/02 705/27.1 |
| 2017/0169341 A1* | 6/2017 | Tang | G06F 16/00 |
| 2018/0089328 A1 | 3/2018 | Bath et al. | |
| 2019/0095478 A1 | 3/2019 | Tankersley et al. | |
| 2019/0164176 A1* | 5/2019 | Pydynowski | H04L 67/535 |
| 2019/0172117 A1* | 6/2019 | Sharma | G06Q 30/0631 |
| 2019/0392018 A1 | 12/2019 | Reedy | |
| 2020/0074565 A1 | 3/2020 | Dotter | |
| 2020/0151680 A1* | 5/2020 | Edwards | G06V 30/414 |
| 2021/0192614 A1 | 6/2021 | Thompson et al. | |
| 2021/0407017 A1* | 12/2021 | Lesner | G06Q 40/02 |
| 2023/0101449 A1 | 3/2023 | Minar et al. | |

OTHER PUBLICATIONS

"Notice of Allowance," mailed Dec. 28, 2023 in U.S. Appl. No. 17/939,625. 10 pages.
Machine Translation of WO 2018000136 A1, Jan. 4, 2018, 56 pages.
U.S. Appl. No. 17/939,630, Non-Final Office Action, Sep. 4, 2024, 19 pages.
U.S. Appl. No. 17/939,630, Notice of Allowance, Mailed on May 7, 2025, 10 pages.

* cited by examiner

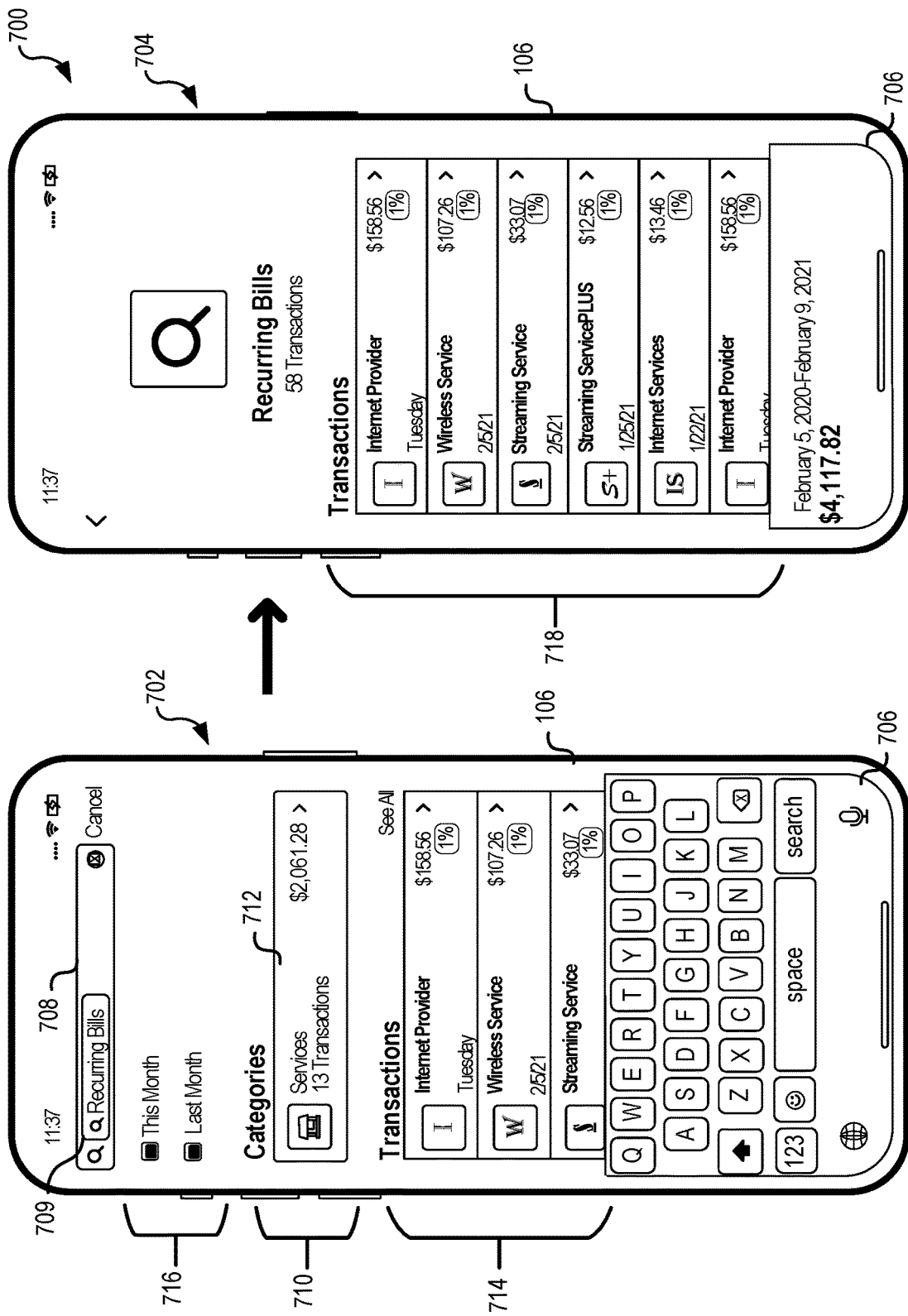

TRANSACTION TAGS FOR ENHANCED SEARCHING

CROSS-REFERENCES TO RELATED APPLICATIONS

This application claims priority under 35 U.S.C. § 119 (e) to U.S. provisional application No. 63/248,215, filed Sep. 24, 2021, entitled "Transaction Tags for Enhanced Searching," which is herein incorporated by reference in its entirety for all purposes or the contents of which are herein incorporated by reference. This application is related to U.S. Patent Application Ser. No. 17/939,625, filed Sep. 7, 2022, entitled, "Generation of Transaction Tags for Enhanced Searching," which claims priority under 35 U.S.C. § 119 (e) to U.S. provisional application No. 63/248,111, filed Sep. 24, 2021, entitled "Generation of Transaction Tags for Enhanced Searching," the contents of which are herein incorporated by reference. This application is also related to U.S. Patent Application Ser. No. 17/939,630, filed Sep. 7, 2022, entitled, "Transaction Tags for Enhanced Suggestions," which claims priority under 35 U.S.C. § 119 (e) to U.S. provisional application No. 63/248,111, filed Sep. 24, 2021, entitled "Generation of Transaction Tags for Enhanced Searching," the contents of which are herein incorporated by reference.

BACKGROUND

Transaction records may be stored by a server and/or shared with a client device. The client device may view the transaction records by interacting with the server and/or searching local copies. The information in a transaction record may be limited to a few fields. The client device may use these fields to search and/or filter the transaction records. However, because of the small number of fields, the results of such searching and/or filtering may be limited.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving, at a user device, transaction data from a service provider, the transaction data including a plurality of transaction records each associated with an individual transaction and a plurality of characteristics. The computer-implemented method also includes storing the plurality of transaction records on the user device. The computer-implemented method also includes determining one or more tags to associate with individual transaction records of the plurality of transaction records based at least in part on a subset of characteristics of the plurality of characteristics associated with the individual transaction records. The computer-implemented method also includes modifying the individual transaction records to include data representative of the one or more tags. The computer-implemented method also includes responsive to receiving a request for transaction information: identifying a set of transaction records of the plurality of transaction records based at least in part on the one or more tags, and providing information associated with the set of transaction records for presentation at the user device. Other embodiments of this aspect include corresponding computer systems, apparatus, and computer programs recorded on one or more computer storage devices, each configured to perform the actions of the methods.

Another general aspect includes a computer-implemented method. The computer-implemented method also includes receiving, via an input component of a user device, a first user input relating to a search query of a plurality of transaction records. The computer-implemented method also includes providing, for presentation at a display of the user device, one or more suggested search queries based at least in part on the first user input, each suggested search query of the one or more suggested search queries representing one or more tags that have been associated with a set of transaction records of the plurality of transaction records. The computer-implemented method also includes receiving, via the input component of the user device, a second user input that selects a first suggested search query of the one or more suggested search queries. The computer-implemented method also includes determining a particular set of transaction records of the plurality of transaction records based at least in part on at least one tag that is represented by the first suggested search query. The computer-implemented method also includes providing, for presentation at the display, transaction information associated with the particular set of transaction records. Other embodiments of this aspect include corresponding computer systems, apparatus, and computer programs recorded on one or more computer storage devices, each configured to perform the actions of the methods.

Another general aspect includes a computer-implemented method. The computer-implemented method includes receiving, at a user device and from a service provider, transaction data associated with an account. The transaction data including a plurality of transaction records each associated with an individual transaction and a plurality of characteristics. The computer-implemented method also includes associating one or more tags with individual transaction records of the plurality of transaction records based at least in part on a subset of characteristics of the plurality of characteristics associated with the individual transaction records. The computer-implemented method also includes determining a plurality of suggested payment amounts for payment corresponding to an account balance of the account based at least in part on the individual transaction records associated with the one or more tags and account information associated with the account. The computer-implemented method also includes providing, for presentation at the user device, information that identifies one or more suggested payment amounts of the plurality of suggested payment amounts. Other embodiments of this aspect include corresponding computer systems, apparatus, and computer programs recorded on one or more computer storage devices, each configured to perform the actions of the methods

BRIEF DESCRIPTION OF THE DRAWINGS

FIG. 7A illustrates an example user interface for enhanced transaction searching, according to at least one example.

DETAILED DESCRIPTION

Figure 1:
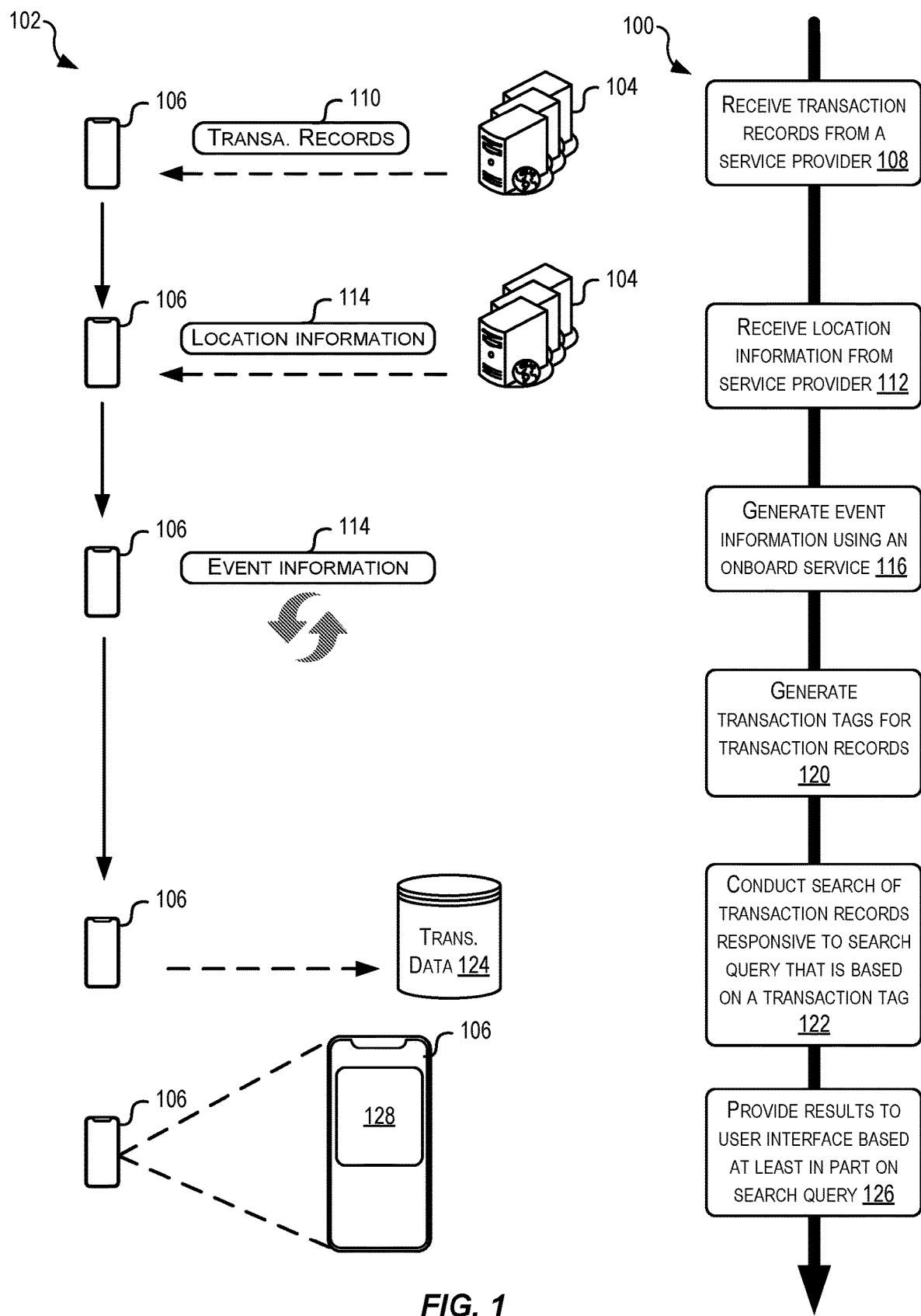
FIG. 1 illustrates a block diagram and a flowchart showing an example process for generating transaction tags for enhanced transaction searching, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, methods, systems, devices, and computer-readable storage media relating to user devices generating transaction tags for transaction records using characteristics of the transaction records and other information that enhances the transaction records. Generally, a transaction tag may indicate that a transaction is of a particular type and/or has certain properties based on the definition of the transaction tag. For example, a recurring transaction tag may be given to those transactions that have similar entity identifiers, amounts, and transaction dates. This data is indicative of these transactions being on some recurring schedule. The transaction records may be modified such that the transaction tags are included as part of the transaction records and stored on the device. Because the transaction records are stored on the device, an enhanced searching user interface may be implemented that relies upon the tagged transaction records and, in some examples, a set of predefined search queries also built upon transaction tags.

In some examples, the transaction tags are used to build search indexes to improve or otherwise increase the rate at which on-device search queries can be performed. Thus, rather than conducting a search on an entire database of transaction records (which can be process-intensive if performed on the device or bandwidth-intensive if performed in communication with a server), on-device indexes can be used to quickly retrieve a precise set of transactions that have previously been tagged using the techniques described herein.

Various approaches for generating different types are described herein. Unlike conventional approaches that may process transaction data on a remote server, the approaches described herein generate the tags on-device. This improves security because the likelihood of a user's device being the target of a hack and the user's sensitive data being revealed is much lower than the likelihood that a server will be targeted. Additionally, because the transaction data is stored and processed on the user device rather than at the server, user privacy is preserved.

Turning now to a first particular example, a user device is described that is in network communication with a service provider. The service provider receives a set of transaction records relating to one or more transaction instruments from a transaction processing server. The service provider sends the set of transaction records to the user device. The user devices include one or more purpose-built algorithms, routines, machine learning models, etc. that generate transaction tags based on characteristics of the set of transaction records and, in some examples, other information obtained from the service provider (e.g., location information) and/or from other sources on the user device (e.g., calendar information, email information, location information, etc.). Once a tag has been generated, the user device modifies the relevant transaction record(s) to include the generated tag. At this point, the relevant transaction record having its original characteristics (e.g., fields and values) may also include one or more new fields based on the generated tag. Responsive to a user request for transaction information represented by the tag, the user device may retrieve and provide for presentation at the user device the relevant transaction records.

Turning now to a second particular example that is related to the first particular example, a user device including an enhanced searching user interface is provided. The enhanced searching user interface may be used to search for transaction records having certain previously generated tags. As the user begins entering a search query into a search box, the user device may provide some suggested search queries. For example, if the user was interested in knowing information about transactions relating to coffee, they may begin typing "coff" in the search bar. In response, the user device may present a set of suggested search queries relating to coffee. These suggested search queries may be based on transaction records that have been previously tagged by the user device using the approaches described in the first particular example. For example, the suggested search queries may include a query for a particular entity that might sell coffee, even those that do not include "coffee" in their entity name, or a query for all transactions for coffee. Unlike conventional approaches that may only be able to search transaction records based on entity names that expressly include "coffee" in their names (e.g., "Peet's Coffee"), the user device may be able to search for transactions that were conducted at locations that do or likely sell coffee (e.g., "Corner Cafe," "Monorail Sips," etc.). Once the user selects one of the suggested search queries and/or enters their own search query, the user device may suggest other search queries that can be added to any previously input search queries (e.g., recurring coffee transactions, transactions for coffee in particular locations, or part of particular event, etc.) to search a database of transaction records. This includes retrieving a subset of the transaction records and populating the user interface to include some representation of the transaction records. In some examples, the transaction records may be grouped, organized, or otherwise presented in a manner that improves user understanding of the transaction records.

In some examples, suggested search queries may be presented at the user device, without the user having to initiate a search query. For example, such suggested search queries may change depending on the set of transactions being considered for a give time period. In some examples, a suggested search query to search for a price change in a recurring transaction (e.g., tagged with a recurring transaction tag) may be surfaced to the user device after the price change has been detected (e.g., a recurring monthly charge is $77.32 for 12 months, then increases to $98.15 in a thirteenth month). If no price changes have been detected across any of the recurring transactions, the user device may not present this type of suggested search query.

In some examples, the techniques described herein may evaluate transactions to identify savings-related transactions. Information about savings-related transactions may be surfaced to the user as messages, suggested search queries, and the like. As an example, assume that an account (e.g., credit card account) offers a 1% cash back for purchases in which the card is present and 2% cash back for purchases contactless-type "tap-to-pay" transactions (e.g., payment via a user device such as a smartphone or smartwatch). The techniques described herein can be used to tag such transactions and share information about total savings (e.g., total amount saved using all transactions or a part of all transactions), missed savings (e.g., how much a user could have saved had they performed a contactless-type transaction), and the like. In some examples, information about savings may be presented to the user device using methods such as, for example, via a notification, a message, a suggested search query, and the like. Such messages may be shared with qualifying users, such as those that have a relevant credit card or other account. This message can be shared within an application such as a carousel of relevant messages into a digital wallet application of the user device.

In some examples, the techniques described herein may evaluate transactions to identify suggestions for management of a payment account. For example, using a set of tagged transactions, the system can suggest that a user make a payment on a credit card that includes an amount equal to some subset of the tagged transactions. The user may be more motivated to make a payment when the payment amount in some way relates to prior purchases made by the user on the credit card (e.g., transactions from a trip, recurring transactions, large transactions, small transactions, transactions made in a geographic location, transaction for a type of product, etc.). Once the transactions have been tagged, any variety of suggested payment combinations can be made. The suggestions can be included in any suitable user interface, but may be particularly useful when presented as part of a payment suggestion interface or within a list of transactions, as described herein.

Turning now to a third particular example, in this example, a user device including a payment suggestion user interface is provided. At least some portion of the content presented in the payment suggestion user interface may be based on transaction records having certain previously generated tags. The payment suggestion user interface may be used to present certain payment suggestions for a user, which may be particularly tailored to help the user understand how different payment amounts relate to prior purchases and a total balance. The payment suggestions may function as nudges to encourage the user to make payments towards the total balance. When the payment suggestions are presented in a payment suggestion user interface, the user may move a moveable selector around the user interface to select different payment suggestions, which then can be initiated using the user interface.

The systems, devices, and techniques described herein provide several technical advantages that improve the security of maintaining, processing, and searching transactions, and protect user privacy. For example, as described previously, because the primary transaction processing occurs on a user device, any custom tagging and the like is stored safely and securely on the device. Because the service provider is unable to access the tagged transaction data, the user's privacy is protected with respect to the service provider and from security threats and vulnerabilities of the service provider.

As an additional technical advantage, the techniques described herein provide a more efficient process for searching transaction information on user devices. In particular, this process requires fewer click-throughs, page views, data input at data input fields, and the like, as compared to conventional approaches. For example, in at least one example use case, a user may select from a set of suggested search queries. Selection of one of these suggested queries may be performed more efficiently than inputting an entire query, especially, when the query includes a complex set of search parameters (e.g., location, product, date, recurring, etc.).

When search queries are based on predefined search queries, e.g., suggested search queries, additional technical advantages include bandwidth savings and power-consumption savings on the user device. Both advantages are the result of a user device performing a search using predefined tags. Unlike conventional approaches that do not include tags, performing an on-device search using tagged transactions avoids the need of the user device to communicate with the service provider, thereby freeing up bandwidth resources for other uses. Additionally, because the tagged transaction records are stored on-device and tagged according to a set of predefined search criteria, unlike conventional approaches that require processor-heavy searching of entire databases of transaction records, the techniques described herein, when coupled with suggested search queries, may quickly and efficiently identify records of interest. This approach for searching and presentation of identified information on the user interface results in processor savings and corresponding battery savings on mobile user devices.

Turning now to the figures, FIG. 1 illustrates a block diagram 102 and a flowchart showing a process 100 for generating transaction tags for enhanced transaction searching, according to at least one example. The diagram 102 includes a service provider 104. As described in further detail with respect to FIG. 2, the service provider 104 is any suitable combination of computing devices such as one or more server computers, which may include virtual resources, services, and the like capable of performing the functions described with respect to the service provider. Generally, the service provider 104 is configured to share transaction records and correlating information with user device.

The diagram 102 also includes a user device 106. The user device 106 may be operated by a user. The user device 106 may be any suitable electronic device capable of performing the techniques described herein. In some examples, the user device may be a handheld and/or portable user device such as a mobile phone, smartwatch, tablet, laptop, and the like.

FIGS. 1, 3, 5, 8, 10, 12, 14, and 15 illustrate example flow diagrams showing processes 100, 300, 500, 800, 1000, 1200, 1400, and 1500, according to at least a few examples. These processes, and any other processes described herein, are illustrated as logical flow diagrams, each operation of which represents a sequence of operations that can be implemented in hardware, computer instructions, or a combination thereof. In the context of computer instructions, the operations may represent computer-executable instructions stored on one or more non-transitory computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer-readable storage medium, for example, in the form of a computer program including a plurality of instructions executable by one or more processors.

The process 100 begins at 108 by the user device 106 receiving transaction records 110 from the service provider 104. In some examples, a transaction service of the service provider 104 may send the transaction records 110. As described elsewhere herein, the service provider 104 may obtain the transaction records 110 (or some form thereof) from a transaction processing system that builds some form of the transaction records based on information gathered when the transaction originally occurred. The service provider 104 may revise, augment, and/or remove data in the transaction records received from the PPS before sending the transaction records 110 to the user device 106. The user device 106 may receive the transaction records and perform the process 100 in accordance with some predefined cadence (e.g., every few hours, every day, every week, etc.).

At block 112, the process 100 includes the user device 106 receiving location information 114 from the service provider 104. In some examples, a location service of the service provider 104 may send the location information 114 to the user device 106. The location information 114 may represent geographic boundaries associated with certain locations (e.g., points of interest, cities, neighborhoods, etc.) and entity information that identifies, for each entity, one or more goods or services offered by each entity. This signal can be used to generate product-based transaction tags, which may enable searching of transaction-based on a specific product (e.g., tacos, coffee, cookies, etc.). This signal can also be used to generate location-based transaction tags, which may enable searching of transactions based on a particular location or point of interest (e.g., a visit to Pike Place Market, time spent in Brooklyn, etc.).

At block 116, the process 100 includes the user device 106 generating event information 118 using an onboard service. The onboard service may execute on the user device 106 to generate the event information 118. In some examples, the onboard service may generally function without contacting the service provider 104. In some examples, the onboard service may rely on the service provider 104 for at least some aspects of the service. The onboard service may be part of a virtual personal assistant platform. Using this platform, the user device can search various other applications and user data stored on the user device. This may include event data that is mined from the user's calendar, from an email application, and/or from any other suitable application (e.g., ticketing application, travel application, etc.). The event data may define one or more events, and the device may use the event data to generate tags of transaction records from the events. This signal can be used to generate event-based and time-bound tags, which may enable searching of transactions based on a particular event (e.g., an evening at a concert, a trip to Europe, etc.).

At block 120, the process 100 includes the user device 106 generating transaction tags for at least some of the transaction records 110. Generating the transaction tags may include performing one or more of a plurality of operations, described herein, for determining that a transaction record meets the definition of a particular type of transaction. More than one transaction tag may be generated and assigned to a single transaction record. Once generated, the transaction records may be modified to include the generated transaction tags. The tags may be used to generate search indexes for searching the transaction records 110 stored on the user device 106.

At block 122, the process 100 includes the user device 106 conducting a search of transaction records responsive to a search query that is based on a transaction tag. The search may be conducted by searching a transaction data database 124. The transaction records received at 108 may also be stored in the transaction data database 124. Similarly, once a transaction tag has been generated, modified transaction records that include transaction tags may be stored in the transaction data database 124. The search may be conducted using an enhanced searching user interface, as described elsewhere herein. This user interface may enable efficient searching of tagged transaction records.

At block 126, the process 100 includes the user device 106 providing results to a user interface 128 based at least in part on the search query of block 122. The user interface 128 may be the same enhanced searching user interface described with respect to block 122 and later figures. Providing the search results may enable the user to view sets of transaction records organized according to the transaction tags.

Figure 2:
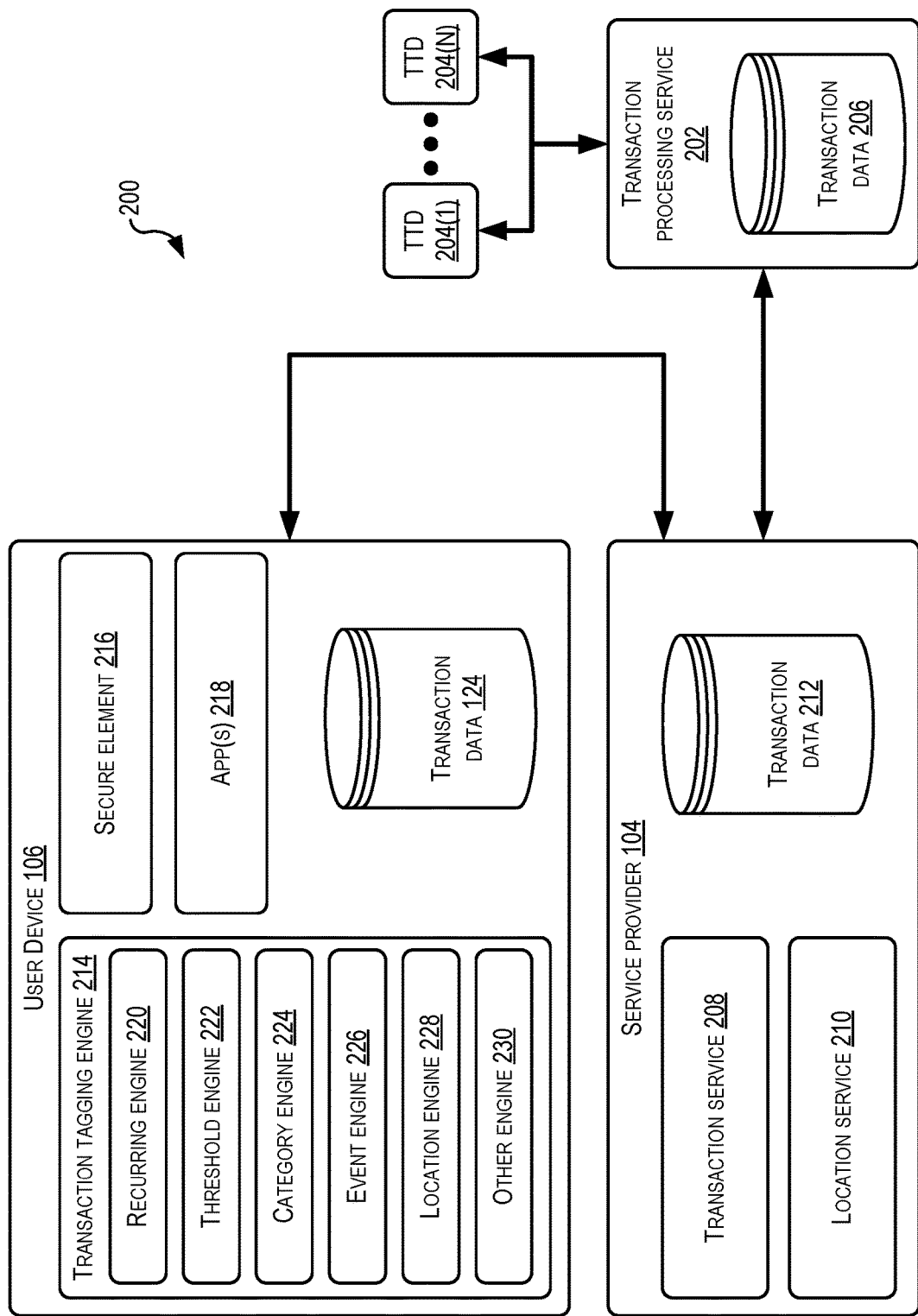
FIG. 2 illustrates a block diagram showing an example architecture or system for generating transaction tags for enhanced transaction searching, according to at least one example.

FIG. 2 illustrates a block diagram showing an example architecture or system 200 for generating transaction tags for enhanced transaction searching, according to at least one example. The system 200 includes a few elements introduced in FIG. 1. In particular, the system 200 includes the service provider 104, the user device 106, and the transaction data database 124. The system 200 also includes a transaction processing service 202 that is communicatively coupled with one or more transaction terminal devices (TTD) 204(1)-204(N). The arrows between elements of the system 200 generally indicate that these elements are communicatively coupled, either via a wired network connection, a wireless connection, or in any other suitable manner. However, the arrows should not be viewed as limited because at least some elements may communicate with each other, despite there not being arrows between them.

Beginning with the transaction processing service 202, the transaction processing service 202 may include a transaction data database 206 configured to store transaction data, e.g., in the form of transaction records. The transaction records, or at least data upon which the transaction records can be generated by the transaction processing service 202, may be obtained from one or more transaction terminal devices 204. In some examples, the transaction terminal devices 204 are examples of point-of-sale devices and the transaction processing service 202 is an example of a payment processing service. The transaction terminal devices 204 may be located at a stationary location (e.g., mounted within a shop) and/or may be mobile (e.g., a mobile terminal). The transaction terminal devices 204 may be configured to process transactions, which in some examples, may be based on transaction instruments such as credit cards, debit cards, and the like.

The transaction terminal devices 204 may gather any suitable information that is descriptive of a transaction. This may include, for example, location of the transaction terminal device (e.g., address, latitude and longitude, etc.), entity identifier (e.g., a unique identifier that identifies an entity), a transaction terminal device identifier, an entity name, an entity address, transaction amount, and other transaction processing information (e.g., number associated with transaction instrument, name of instrument issuer, name of instrument owner, transaction codes, signatures, etc.). This information may be shared with the transaction processing service 202, which, in some examples, may store the information (or at least a portion of it) within the transaction data database 206. The transaction processing service 202 may, in some examples, forward at least some portion of the information to the service provider 104. For example, the transaction processing service 202 may process transactions for a variety of different instruments issued by different entities. In this example, the transaction processing service 202 may share with the service provider 104 only the information associated with transaction instrument(s) issued by or otherwise associated with the service provider 104. For example, an entity that operates the service provider 104 may be the same entity that provides the ecosystem in which the user devices 106 operate. This entity either on its own or in connection with a bank may issue a transaction instrument such as a payment instrument. In this example, the transaction information described herein may be the transaction information for users of the service provider 104 that have the transaction instrument. In some examples, this may include users that operate the user devices 106 and/or other users that do not own user devices.

Turning now to the service provider 104, the service provider 104 may include one or more elements relating to implementing the approaches described herein. This may include, for example, a transaction service 208, a location service 210, and a transaction data database 212. The transaction service 208 may be configured to process the transaction records obtained from the transaction terminal device 204 and store the transaction records in the transaction data database 212. As part of doing so, the transaction service 208 may add fields, remove fields, and/or adjust values within the transaction records. This may include, for example, adjusting an entity name field to include a proper name of the entity, adding image information associated with the entity (e.g., an image tile or a link to an image tile of the entity's logo), and performing any other technique to adjust the record. In some examples, the transaction service 208 provides transaction information to the user device 106, and the user device 106 adjusts the records relevant to the user of the user device 106 and/or generates transaction tags based on the transaction information. The modified records may then be stored in the transaction data database 212 and/or sent to the user device 106.

The location service 210 may also be configured to process the transaction records obtained from the transaction terminal device 204 and store the transaction records in the transaction data database 212. As part of doing so, the location service 210 may add fields to the records. For example, an added field may identify one or more products or services associated with a particular entity. The location service 210 may be built on the backbone of a service that maintains data for a map application. Thus, the location service 210 may include data about various landmarks, points of interest, entity locations, and the like. In some examples, the location service 210 provides location information to the user device 106, and the user device 106 adjusts the records relevant to the user of the user device 106 and/or generates transaction tags based on the location information. The modified records may then be stored in the transaction data database 212, 124, and/or sent to the user device 106.

Turning now to the user device 106, the user device 106 may include a transaction tagging engine 214, a secure element 216, applications 218, and the transaction data database 124. Generally, the transaction tagging engine 214 may be configured to generate various types of transaction tags as described herein. The secure element 216 may be a specialized chip including software and/or firmware configured to securely store sensitive information (e.g., transaction instrument information) and applets or other modules. These applets may be used when conducting a financial transaction. In some examples, the transaction data database 124 may be stored within the secure element 216. In some examples, the secure element 216 may enable one or more other applications such as a transaction application for executing transactions using the user device 106.

The applications 218 may include any suitable application such as transaction instrument management application. Such an application may be used to manage a transaction instrument associated with a user profile of a user of the user device 106. The enhanced searching user interfaces described herein may be provided by the transaction instrument application and/or may be provided by the transaction tagging engine 214. In some examples, however, the transaction tagging engine 214 may generate tags, modify transaction records to include the tags, and store the tags in the transaction data database 124, and one of the applications 218 may be used to search and surface information about the transaction records (e.g., using the enhanced searching user interface).

The transaction tagging engine 214 may include one or more engines, components, modules, or the like for implementing the functions described herein. The illustrated engines are examples and should not be interpreted as being the only such engines that can be included in the transaction tagging engine 214. As illustrated, the transaction tagging engine 214 may include a recurring engine 220, a threshold engine 222, a category engine 224, an event engine 226, a location engine 228, and other engine 230.

Generally, the recurring engine 220 may be configured to generate transaction tags that identify recurring transactions. A recurring transaction may be defined, as described herein. The recurring engine 220 may perform the function described with reference to FIGS. 5 and 6.

Generally, the threshold engine 222 may be configured to generate transaction tags that identify certain transaction records based on one or more thresholds. For example, the threshold engine 22 may perform the function described with reference to FIG. 3 as it relates to identify "expensive" transaction records.

Generally, the category engine 224 may be configured to generate transaction tags that identify certain transactions associated with goods or services within different categories. For example, the category engine 224 may perform the function described with reference to FIG. 8 as it relates to identifying transaction records associated with certain products.

Generally, the event engine 226 may be configured to generate transaction tags that identify certain transaction records associated with events. For example, the event engine 226 may perform the function described with reference to FIG. 10 as it relates to identifying transaction records associated with events.

Generally, the location engine 228 may be configured to generate transaction tags that identify certain transaction records associated with locations. For example, the location engine 228 may perform the function described with reference to FIG. 12 as it relates to identifying transaction records occurring within some predefined location and/or adjacent to a predefined location.

Finally, the other engine 230 may be configured to generate other types of transaction tags not previously described with respect to the engines 220-228. For example, the user may be enabled to define their own types of transaction tags, and the other engine 230 may be used to generate transaction tags for these types of transactions. In some examples, the other engine 230 may be used to generate statements, payment suggestions, user interfaces for tag-based transaction payment suggestions, and the like.

Figure 3:
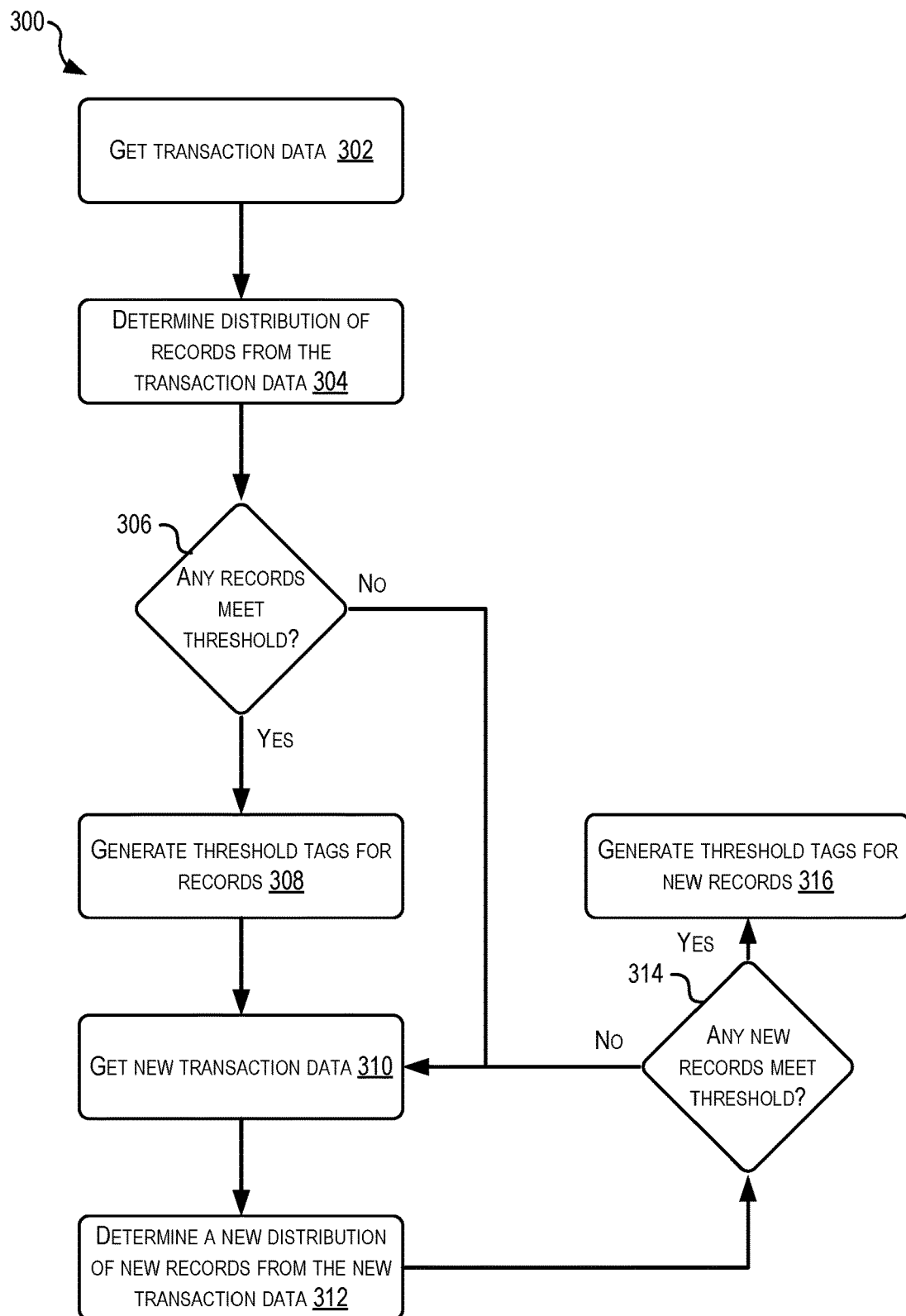
FIG. 3 illustrates a flowchart showing an example process for generating transaction tags for enhanced transaction searching, according to at least one example.
Figure 4:
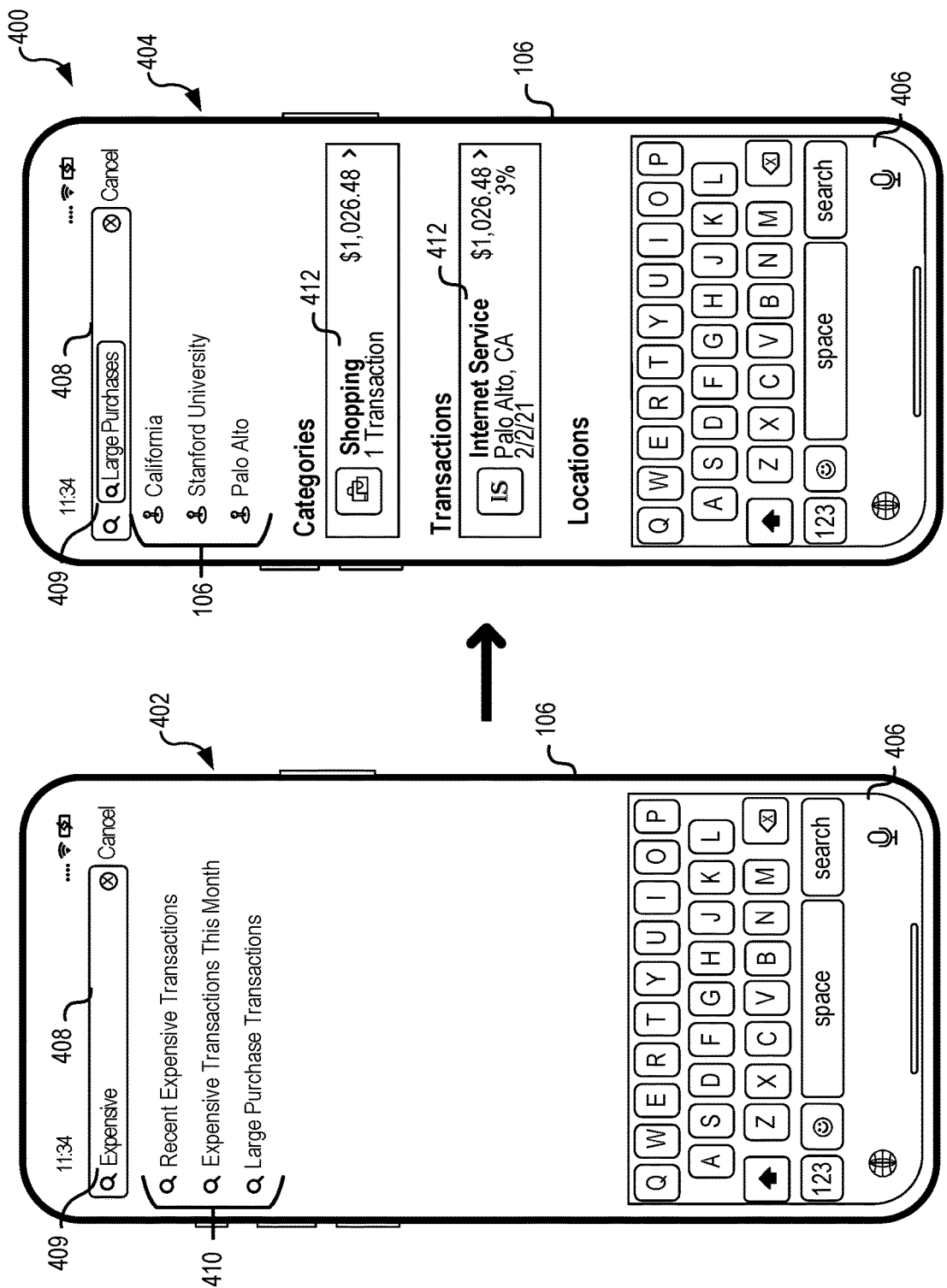
FIG. 4 illustrates an example user interface for enhanced transaction searching, according to at least one example.

Turning now to FIG. 3, this figure illustrates a flowchart showing an example process 300 for generating transaction tags for enhanced transaction searching, according to at least one example. The process 300 may be performed by the user device 106 (FIG. 1) and in particular the threshold engine 222 (FIG. 2). The process 300 may relate to an approach for generating transaction tags using a distribution of transaction amounts and one or more thresholds. The generated transaction tags can then be persisted to the corresponding transaction records by modifying the transaction records to include the transaction tags. Once the threshold tags have been generated using the process 300, the tags may be used to populate an enhanced searching user interface 400, as shown in FIG. 4.

The process 300 begins at 302 by the user device 106 getting transaction data. This may include receiving the transaction data from the service provider 104, from the transaction processing service 202, from the transaction terminal devices 204, and in any other suitable manner. In some examples, the transaction data may include a plurality of transaction records. The user device 106 may request the transaction data from the service provider 104 according to some predefined schedule (e.g., nightly), responsive to some message and/or trigger (e.g., after the user device 106 is used for a transaction), and in any other suitable manner (e.g., when the user device 106 is turned on and plugged in or has over a certain percentage of battery life left, etc.).

At block 304, the process 300 includes the user device 106 determining a distribution of records from the transaction data. This may include accessing an amount characteristic (e.g., a value of a transaction amount field) for each transaction record and computing a normal distribution curve using these values. Other distribution curves may also be computed. In some examples, the distribution curves may be determined/updated periodically, as the data underlying the curves may change periodically.

At block 306, the process 300 includes the user device 106 determining whether any records meet a threshold. For example, given the curve, an upper threshold may be set that identifies the 5% most expensive transactions, those in the $98^{th}$ percentile, or using any other suitable approach for identifying groups of transactions. The same work may be done to identify the mean, median, and lower percentile transactions. If there is not sufficient data to identify any record thresholds, then at block 306 the answer will be NO, and the process 300 will proceed to block 310 to get new transaction data. If the answer at block 306 is YES, the process 300 will proceed to block 308.

At block 308, the process 300 includes the user device 106 generating threshold tags for the transaction records that meet the threshold. For example, if the threshold were transactions within the $95^{th}$ percentile and above, the user device 106 may generate a threshold type transaction tag that essentially identifies these transactions as being "expensive." As part of generating the transaction tags, the process 300 may also include the user device 106 modifying the transaction records to include the transaction tags.

At block 310, the process 300 includes the user device 106 getting new transaction records. This block may be performed similar to the block 302.

At block 312, the process 300 includes the user device 106 determining a new distribution of new records from the new transaction data. This block may be performed similar to the block 304. In some examples, the new transaction data may be combined with the transaction data obtained at 302 in order to generate the new distribution based on even more transaction records. In this manner, as more transaction records are obtained, the distribution may change, and the records that are tagged may also change. For example, a most expensive tag may be removed from a first transaction record when it is determined at a later date that a more expensive transaction record has been posted.

At block 314, the process 300 includes the user device 106 determining whether any of the new records meet thresholds. This may be performed similar to block 306. Finally, at block 316, the process 300 includes the user device 106 generating threshold tags for the new records, similar as at block 308.

FIG. 4 illustrates an example user interface 400 for enhanced transaction searching, according to at least one example. The user interface 400 may represent an enhanced searching user interface. The user interface 400 illustrates, in particular, a search query that is based at least in part on threshold-type transaction tags, as discussed with respect to FIG. 3. The user interface 400 may be presented on a display of the user device 106. The user interface 400 may include a first view 402 and a second view 404. The user interface 400 includes an input component 406 such as touchscreen including a virtual keyboard, microphone, or the like. The user interface 400 also includes a search input box 408, at which text may be input. For example, as shown in the user interface view 402, the user has input "expensive" (e.g., search input 409) into the search input box 408. This input has caused the user device 106 to generate a set of suggested search queries 410. These suggested search queries 410 are essentially different ways to sort or otherwise filter the searching. The set of suggested search queries 410 is based on transaction records that have been modified to include one or more transaction tags (e.g., a "recent expensive transaction" tag, "expensive transactions this month" tag, and "large purchase transactions" tag).

As shown in the user interface view 404, the user has selected the "large purchase" tag, which has caused the user device 106 to conduct a tag-based search of transaction records on the user device that have been tagged with the large purchase transaction tag (e.g., a type of threshold tag). In this example, as shown in user interface view 404, a single transaction record 412 has been identified. The user interface view 404 may organize the transaction record 412 based on different characteristics and/or tags associated with the transaction record 412 (e.g., "shopping" category, "internet service" type transaction, etc.). In some examples, suggested search parameters 414 may be added to the search input 409 to further refine the search based on different characteristics and/or tags associated with the transaction record 412.

Figure 5:
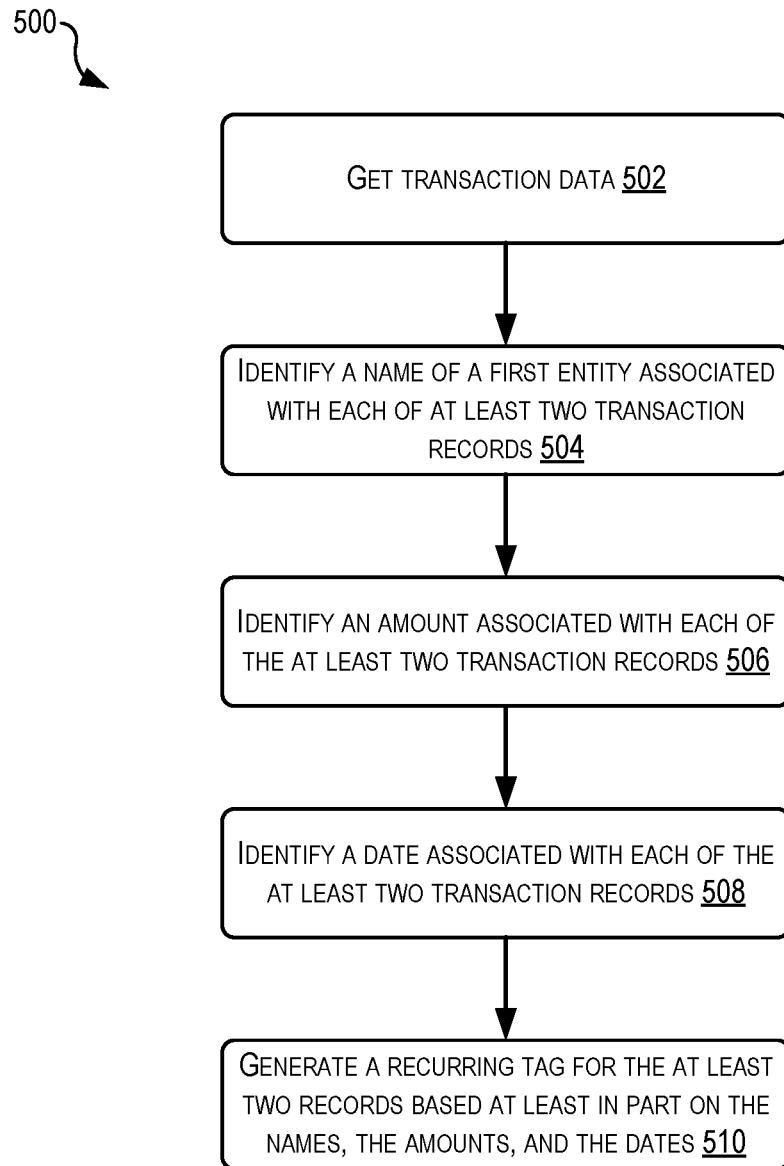
FIG. 5 illustrates a flowchart showing an example process for generating transaction tags for enhanced transaction searching, according to at least one example.

FIG. 5 illustrates a flowchart showing an example process 500 for generating transaction tags for enhanced transaction searching, according to at least one example. The process 500 may be performed by the user device 106 (FIG. 1) and in particular the recurring engine 220 (FIG. 2). The process 500 may relate to an approach for generating transaction tags for transaction records that are recurring (e.g., monthly, yearly, weekly, daily, etc.). Once the recurring transaction tags have been generated using the process 500, the tags may be used to populate an enhanced searching user interface 700, as shown in FIG. 7.

Figure 6:
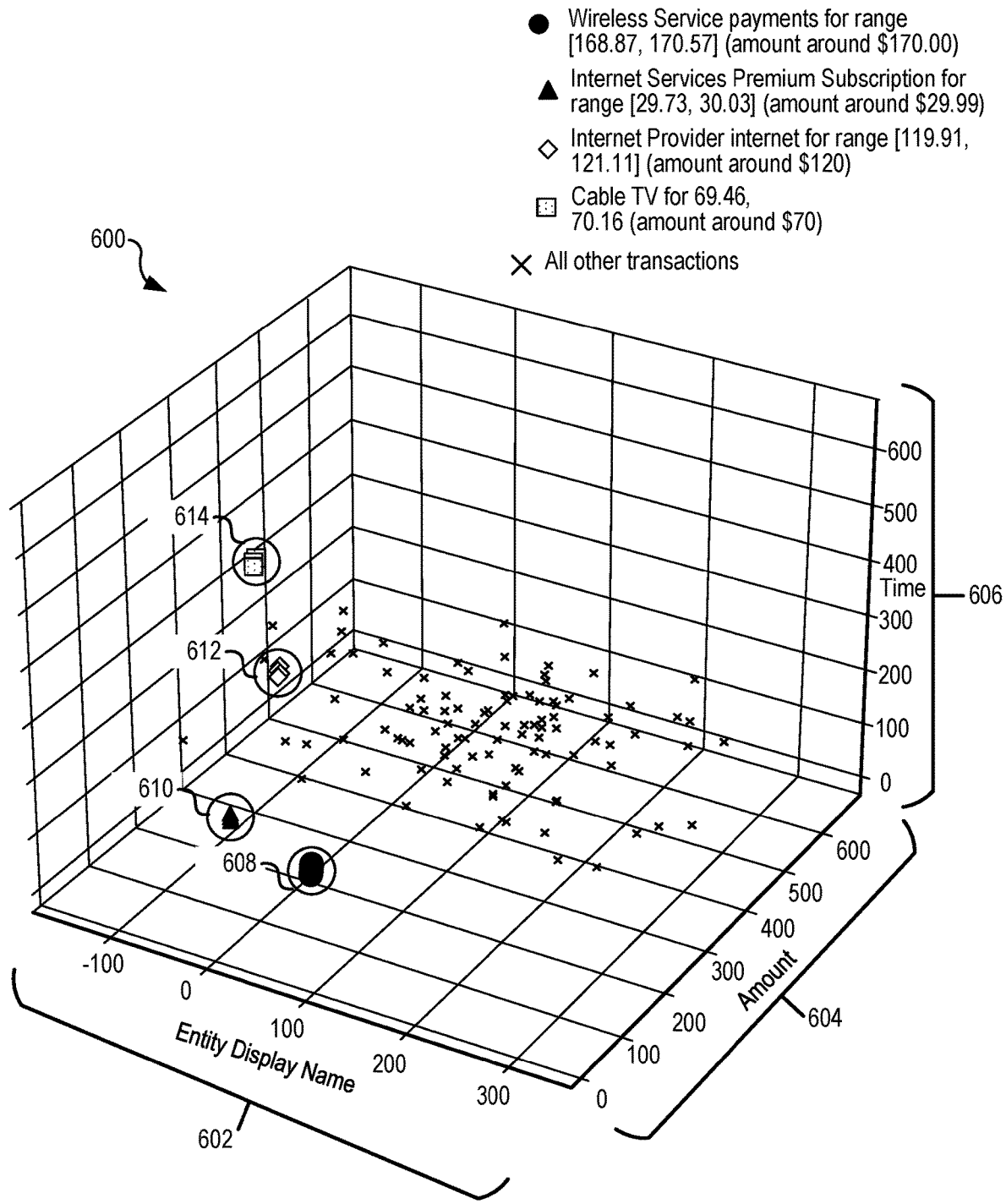
FIG. 6 illustrates a diagram depicting a technique for generating transaction tags for enhanced transaction searching, according to at least one example.

FIG. 6 illustrates a diagram 600 depicting a technique for generating transaction tags for enhanced transaction searching, according to at least one example. The diagram 600 includes three axes, a display name axis 602, an amount axis 604, and a time axis 606. The diagram 600 represents a set of transaction records that has been analyzed with respect to three parameters corresponding to the three axes similar to the process 500. The diagram 600 shows four examples of recurring transactions, illustrated as clusters of individual transactions, along with other non-recurring transactions ("X"). Wireless service transactions 608 (circles) are shown, internet service transactions 610 (triangles) are shown, internet service provider transactions 612 (diamonds) are shown, and cable TV transactions 614 (squares) are shown. The three dimensional coordinates of the wireless service transactions 608 are all similar. It is the same for 610, 612, and 614. Thus, the clustering of these transaction records may identify recurring transactions.

The process 500 begins at 502 by the user device 106 getting transaction data. This may be performed similarly as block 302.

At block 504, the process 500 includes the user device 106 identifying a name of a first entity associated with each of at least two transaction records. For example, this may represent a first step in identifying recurring transactions. These transaction records may be plotted along the axis 602, shown in FIG. 6.

At block 506, the process 500 includes the user device 106 identifying an amount associated with each of the at least two transaction records. For example, this may represent a second step in identifying recurring transactions. These transaction records may be plotted along the axis 604, shown in FIG. 6. In some examples, the amount may not be identical, but may be similar within some threshold. The threshold may be dependent based on the amount of the transaction. For example, as recurring charges are not always exactly the same amount, the process 500 may be configured to account for minor differences in amounts.

At block 508, the process 500 includes the user device 106 identifying a date associated with each of the at least two transaction records. For example, this may represent a third step in identifying recurring transactions. These transaction records may be plotted along the axis 606, shown in FIG. 6. In some examples, like the amount, the date each period may not be identical. For example, some recurring transactions may occur within some threshold distance of a particular day. The process 500 may account for these differences using the three-dimensional coordinates and computing distances between coordinates of clustered transactions.

At block 510, the process 500 includes the user device 106 generating a recurring tag for the at least two records based at least in part on the names, the amounts, and the dates. The recurring tag may indicate that the at least two transaction records are on a recurring schedule.

FIG. 7A illustrates an example user interface 700 for enhanced transaction searching, according to at least one example. The user interface 700 is an example of the user interface 400. The user interface 700 illustrates, in particular, a search query that is based at least in part on recurring transaction tags, as discussed with respect to FIGS. 5 and 6. The user interface 700 may be presented on a display of the user device 106. The user interface 700 may include a first view 702 and a second view 704.

The user interface 700 includes an input component 706, which is an example of the input component 406. The user interface 700 also includes a search input box 708, which is an example of the search input box 408, at which text may be input. For example, as shown in the user interface view 702, the user has input and selected a search query relating to "recurring" (e.g., search input 709) into the search input box 708. This input has caused the user device 106 to conduct a tag-based search of transaction records on the user device 106 that have been tagged with the recurring tag. In this example, as shown in user interface view 702, under category heading 710, thirteen transactions have been identified as recurring service-type transactions. A transaction summary 712 is provided under the category heading 710. The transaction summary 712 indicates the number of transactions and the total spend. Under a transactions heading 714 in the user interface view 702 are listed all transactions that have been tagged as recurring. Suggested search queries 716 are also provided, which, when selected, cause the user device 106 to further limit the recurring transactions based on the specific query.

The user interface view 704 illustrates a list of all recurring transactions 718. For example, the user interface view 704 may be presented responsive to user selection of the "see all" user interface element adjacent the transaction heading 714. The user interface view 704 summarizes the recurring transactions for the given time period.

Figure 7B:
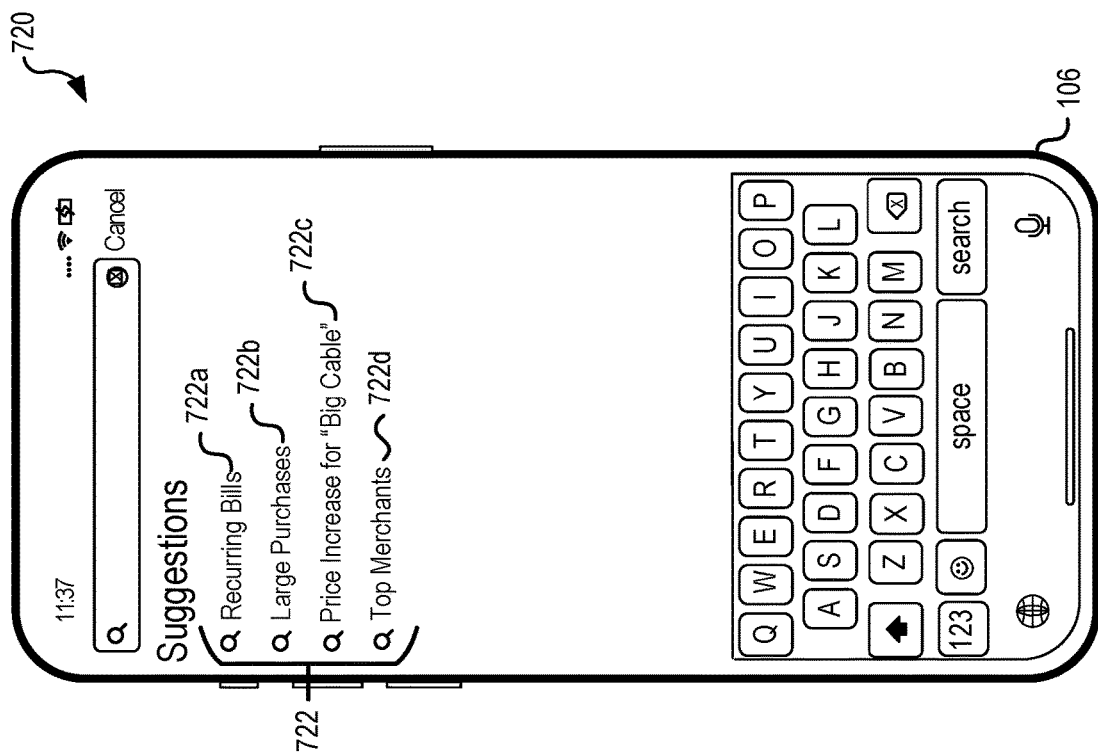
FIG. 7B illustrates an example user interface for enhanced transaction searching, according to at least one example.

FIG. 7B illustrates an example user interface 720 for enhanced transaction searching, according to at least one example. The user interface 720 is an example of the user interfaces 700 and 400. The user interface 700 may be presented on a display of the user device 106. The user interface 720 illustrates, in particular, a set of suggested search queries 722 generated based on various transaction tags, as discussed herein. The set of suggested search queries 722 may be presented on the display of the user device 106 without any user action. For example, unlike other suggested search queries described herein that may be triggered by a user beginning to enter a search term, the set of suggested search queries 722 may be determined in the background and surfaced to the user device 106 as suggestions for user consideration.

Turning now to the set of suggested search queries 722 in more detail, suggested search query 722a may be based at least in part on recurring transaction tags, as discussed with respect to FIGS. 5 and 6. Suggested search query 722b may be generated based on transaction tags that identify large purchases (e.g., those that exceed some threshold), as described herein. Suggested search query 722d may identify some portion of a ranked set of merchants. For example, all merchants may be ranked over some time period (e.g., week, month, multiple months, year, multiple years, etc.) with respect on number of transactions, amount of purchases, and the like. In this example, the "top merchants" may be some arbitrary number of the tops ones (e.g., top five), those that exceed some minimum purchase amount (e.g., those with total purchases over $1000) or transaction quantity (e.g., those with total transaction counts over 50), or the like. Selection of the suggested search query 722d may enable the user to quickly and easily see the top merchants.

Suggested search query 722c may be generated based on transaction tags that identify an increase in a recurring transaction (e.g., a cable bill to Big Cable). For example, transactions may be identified as "recurring" using the techniques described herein. To determine that a recurring transaction has changed (e.g., increased or decreased), the techniques described herein may evaluate the recurring transactions (e.g., transactions tagged as being associated with a periodic payment to Big Cable) to identify changes in the amount of the payments. In some examples, rules may be defined, which may be specific to the type and/or amount of transaction, to determine whether a detected change is sufficient to constitute an additional "amount change" tag. For example, using the techniques described herein, the system may discriminate between a one-time increase in a recurring charge and a month-over-month increase. In a particular example, the user may be paying a cable bill under a one-year contract having a fixed price. During the one year, the user may occasionally rent a movie using an on-demand movie service offered by the cable company. The system described herein may be configured to detect those occasional purchases like this one is not an increase in the recurring amount (e.g., a change to the underlying fixed price), rather is attributable to something else.

In some examples, identifying the change in the recurring transaction may include monitoring recurring transactions to identify a change that exceeds a threshold. The threshold may be specific to a merchant, the amount of history with the recurring transaction, a category associated with the transaction, a relative stability of the recurring transaction, and/or any other suitable factor. In this manner, the threshold may be change over time and/or be adjusted based on these factors. In some examples, detecting the recurring transaction may be helpful for capturing a persistent raise in rate or the end of an introductory term. This can be used to proactively alert users about such changes. In some examples, tighter tolerances may be used for certain categories of transactions (e.g., services) as compared to others like groceries.

In some examples, the set of suggested search queries 722 may be contextualized to a specific user of the user device 106. For example, the set of suggested search queries 722 may change depend on the user's transaction history, their location, their previous search history, and the like.

In some examples, the techniques described herein may be used to identify missed savings opportunities such as those that could have been realized if the user conducted a financial transaction in a different manner. For example, transaction tags may be generated for transactions based on how the transaction occurred (e.g., tap to pay, card insert, card swipe, etc.). When benefit information is available about the credit card account used to perform the transactions, the techniques described herein may additional tag transactions based on whether the transaction qualified for certain benefits and/or could have qualified if used differently. For example, a data structure may store, for each credit card, the conditions for obtaining certain benefits (e.g., rewards (e.g., cash back, points, bill credits, etc.) based on transaction type (e.g., tap to pay, card insert, card swipe, etc.), category of transaction (e.g., travel, fuel, groceries, restaurant, etc.), medical supplies, educational expenses, business expenses, etc. With this information, the techniques described herein can inform the user of how their transactions earned them certain benefits across one or more accounts. The techniques may also inform the user what their transactions could have earned them had they behaved differently (e.g., used tap-to-pay rather than presenting physical card, purchased fuel at a certain retailer rather than at four different retailers, etc.). In some examples, the system described herein may be configured to access the benefit information from one or more external services. For example, card issuing entities may enable systems described herein to access the benefit information on-demand using one or more interfaces, such as APIs. In some examples, the systems may download and refresh the benefit information using other techniques.

Figure 8:
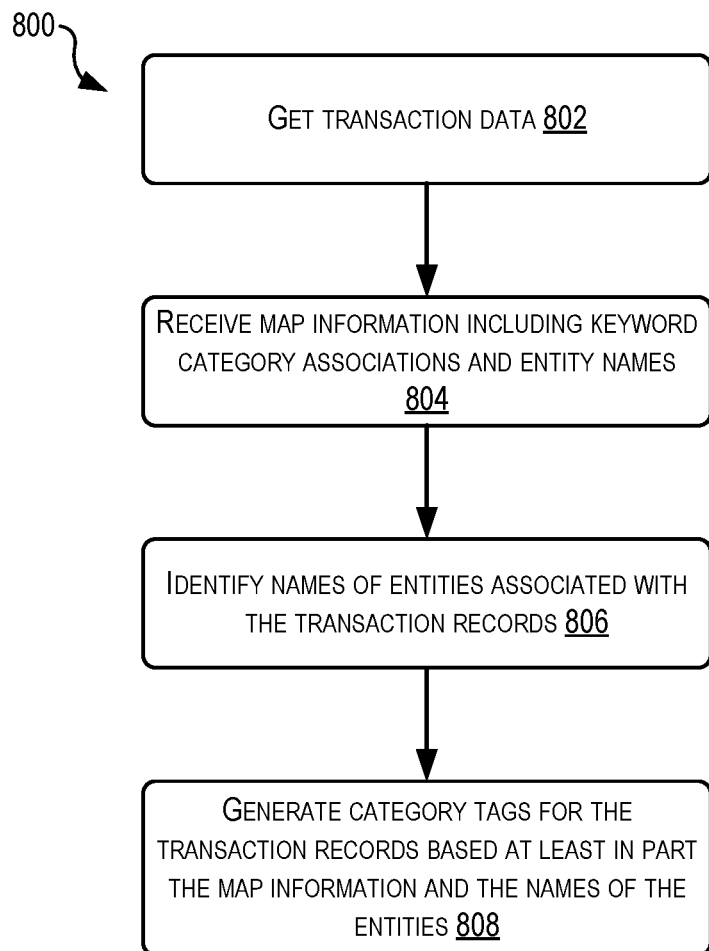
FIG. 8 illustrates a flowchart showing an example process for generating transaction tags for enhanced transaction searching, according to at least one example.

FIG. 8 illustrates a flowchart showing an example process 800 for generating transaction tags for enhanced transaction searching, according to at least one example. The process 800 may be performed by the user device 106 (FIG. 1) and in particular the category engine 224 (FIG. 2). The process 800 may relate to an approach for generating transaction tags that define categories of products or services associated with the transaction records.

The process 800 begins at 802 by the user device 106 getting transaction data. This may be performed similarly as block 302.

At block 804, the process 800 includes the user device 106 receiving location information including keyword category associations and entity names. The location information may be received from the location service of the service provider 104. The keywords may identify which types of products or services are offered by a particular entity. For a coffee shop, the location information may identify coffee, pastries, tea, etc. as products offered at the coffee shop. In some examples, the keywords may be received from a map profile of the entity that is maintained by the location service.

At block 806, the process 800 includes the user device 106 identifying names of entities associated with the transaction records. The entity names may be characteristics of the records (e.g., a value in an entity field), and block 806 may be performed by the user device 106 retrieving the entity names.

At block 808, the process 800 includes the user device 106 generating category tags for the transaction records based at least in part on location information and the names of the entities. For example, the name of the entity obtained at 806 may be used as a key for accessing the information received at 804. When a matching entity is found, the user device 106 may identify the keyword category associations of that entity. These keyword category associations are then used to generate the category tags for the transaction records associated with the matching entity. In some examples, the process 800 may be performed by the user device 106 identifying a list of entities for a particular set of transactions, requesting location information for the list of entities, and then generating the category tags based at least in part on the location information.

Figure 9:
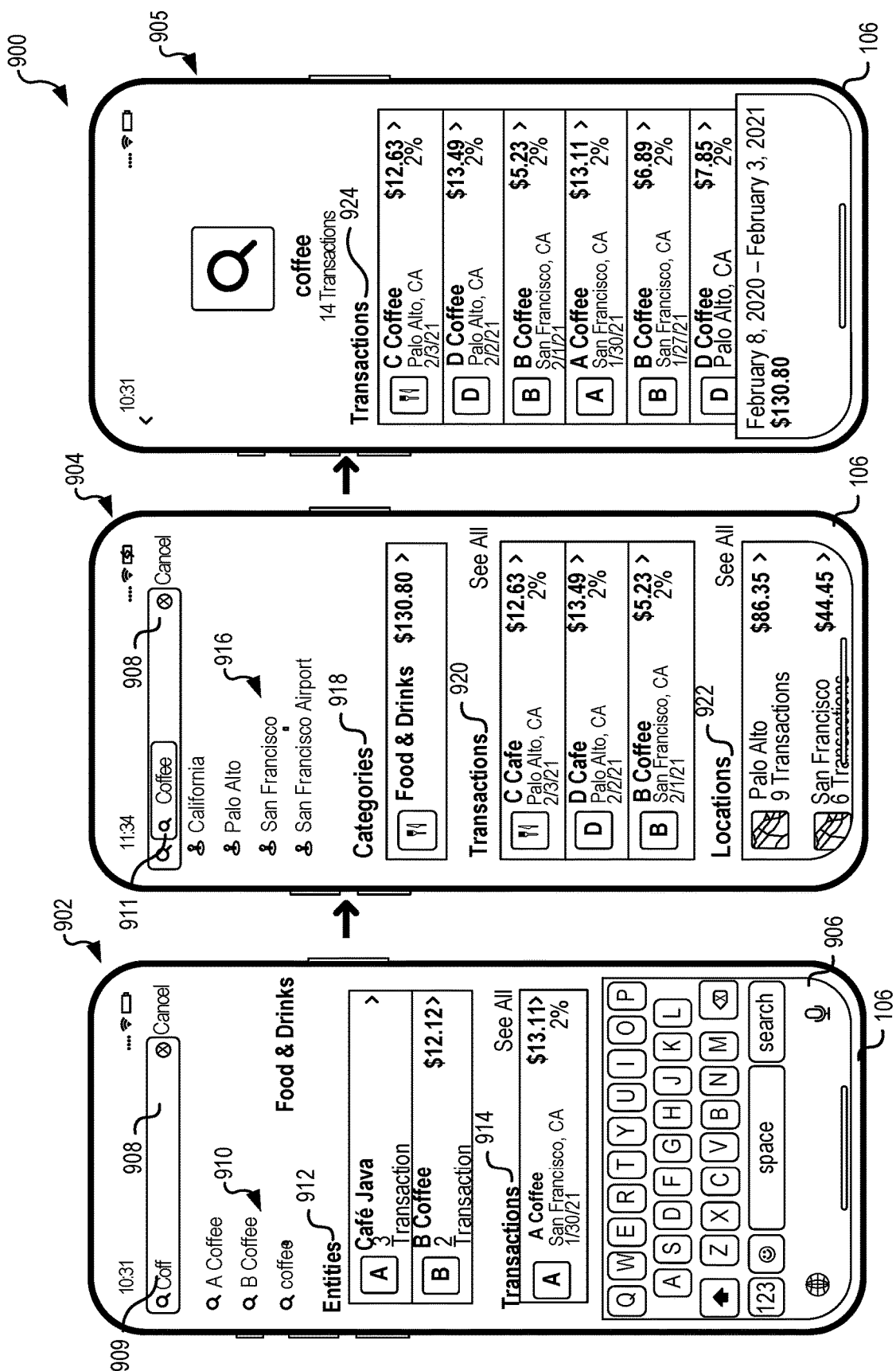
FIG. 9 illustrates an example user interface for enhanced transaction searching, according to at least one example.

FIG. 9 illustrates an example user interface 900 for enhanced transaction searching, according to at least one example. The user interface 900 is an example of the user interface 400. The user interface 900 illustrates, in particular, a search query that is based at least in part on category transaction tags, as discussed with respect to FIG. 8. The user interface 900 may be presented on a display of the user device 106. The user interface 900 may include a first view 902, a second view 904, and a third view 905.

The user interface 900 includes an input component 906, which is an example of the input component 406. The user interface 900 also includes a search input box 908, which is an example of the search input box 408, at which text may be input. For example, as shown in the user interface view 902, the user has begun inputting "coff" (e.g., search input 909) into the search input box 908. At this point, the user device 106 may begin conducting a search in real-time relating to the search input 909 received thus far. The user device 106 also outputs suggested search queries 910. The search results in the user interview view 902 include a summary of results for the search of "coff", which the user device 106 has interpreted as likely being coffee. Thus, under entity heading 912, is presented a list of transaction records at which "coffee" was obtained or is likely to have been obtained. These transaction records may have been previously tagged with "coffee" product-type category tags, as discussed with reference to FIG. 8. This includes entities like "Cafe Java" that does not include "Coffee" in its name, like "B Coffee." This is an example of enhanced transaction searching that goes beyond searching the conventional transaction data in a conventional transaction record. Under a transactions heading 914 in the user interface view 902 are listed all transactions that have been tagged as with the "coffee" product-type category tag.

The user interface view 904 includes user information presented responsive to user selection of suggested search query for "coffee" from the list of suggested search queries 910. Thus, "coffee" is shown as input 911 in the search box 908. The user device 106 has also generated additional suggested search queries 916, which may be based on additional transaction tags such as location or event tags. The user interface view 904 also includes a category heading 918, which shows a total spent on food and drinks including coffee. The user interface view 904 also includes a transaction heading 920, which shows a list of some of the most recent transactions. The user interface view 904 also includes a locations heading 922, which organizes the transactions with respect to locations. For example, it can be seen that the user has spent $86.34 on coffee in Palo Alto. Each of the transaction records under any of the headings 918, 920, or 922 is selectable to drill down into more detail into the transaction.

The user interface view 905 illustrates a list of all transactions 924 associated with the "coffee" product-type category tag. For example, the user interface view 905 may be presented responsive to user selection of the "see all" user interface element adjacent the transaction heading 920. The user interface view 905 summarizes the recurring transactions for the given time period.

Figure 10:
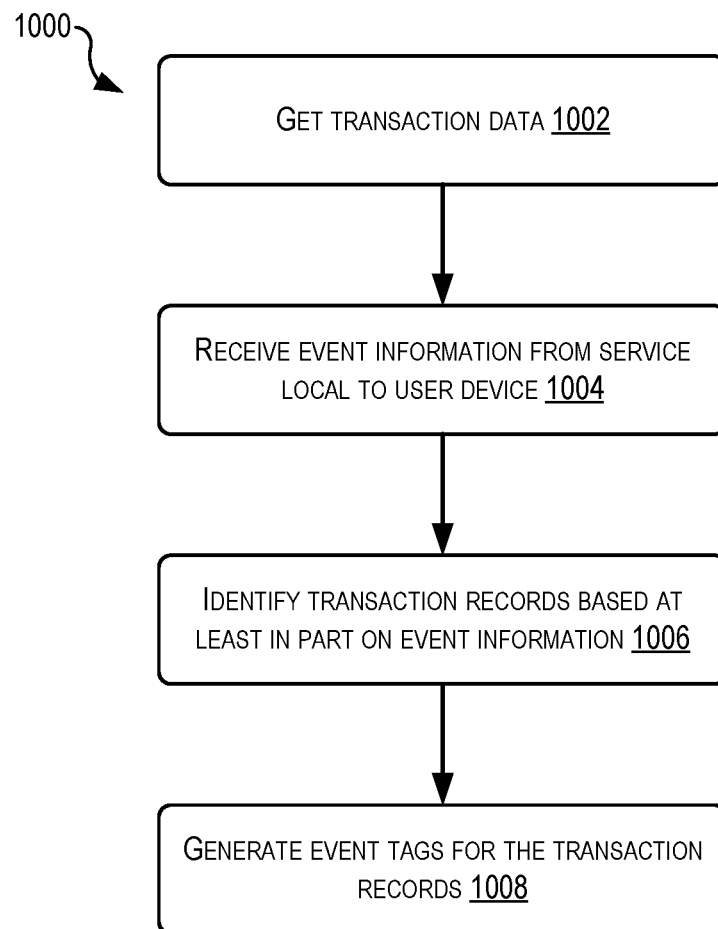
FIG. 10 illustrates a flowchart showing an example process for generating transaction tags for enhanced transaction searching, according to at least one example.

FIG. 10 illustrates a flowchart showing an example process 1000 for generating transaction tags for enhanced transaction searching, according to at least one example. The process 1000 may be performed by the user device 106 (FIG. 1) and in particular the event engine 226 (FIG. 2). The process 1000 may relate to an approach for generating transaction tags that define events associated with transaction records.

The process 1000 begins at 1002 by the user device 106 getting transaction data. This may be performed similarly as block 302.

At block 1004, the process 1000 includes the user device 106 receiving event information from a service that is local to the user device. For example, a service operating on the user device 106 may have access to various applications of operating on the user device 106. This service may extract event information from information items stored in these applications. For example, event information may be obtained by reviewing content of emails to identify an itinerary of an upcoming or past trip (e.g., a confirmation email from a rental company, airline, rental car, etc.). From this, the user device 106 may extract the beginning and end dates of the event to define an event for purposes of transaction tagging. In some examples, the event may also be associated with a location, in addition to a time period. For example, if the flight itinerary was a week-long round trip between Seattle-Tacoma airport and JFK airport, the user device 106 may identify the beginning date as the date of the flight from Seattle to JFK, the location as New York, and an end date as the date of the return flight to Seattle. This event information can be used to generate event-type transaction tags relating to this event.

The user device 106 may also obtain similar and/or different information from a user calendar. For example, if the user had an appointment to attend a baseball game on a Saturday afternoon, the user device 106 may identify the baseball game as an event. Thus, transactions occurring during the baseball game could be tagged with a baseball game event transaction tag.

In some examples, the event tags may be correlated with location information of the user device 106. For example, continuing with the flight itinerary example, the location information for the user device 106 may be used to correlate that the user actually spent time in New York during the week-long trip, rather than leaving New York and traveling elsewhere during the week-long period.

At block 1006, the process 1000 includes the user device 106 identifying transaction records based at least in part on the event information. For example, the user device 106 may identify transaction records for a given time period defined by the event (e.g., all transactions occurring during the user's week-long trip to New York).

At block 1008, the process 1000 includes the user device 106 generating event tags for the identified transaction records. For example, the transaction tags for the New York trip may identify the transactions that likely occurred during the New York trip. Once the transaction tags have been generated, the corresponding transaction records may be modified to include the transaction tags.

Figure 11:
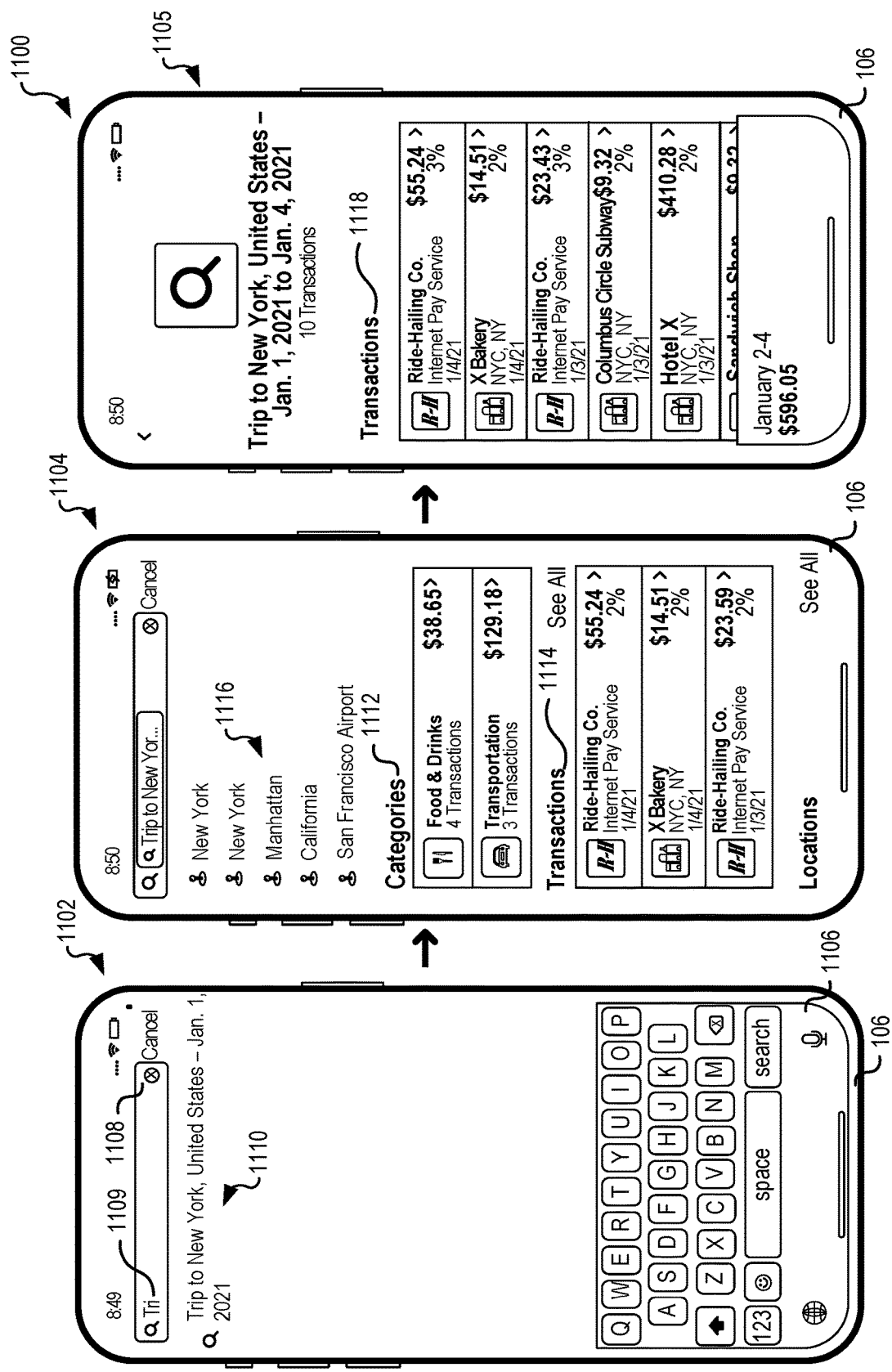
FIG. 11 illustrates an example user interface for enhanced transaction searching, according to at least one example.

FIG. 11 illustrates an example user interface 1100 for enhanced transaction searching, according to at least one example. The user interface 1100 is an example of the user interface 400. The user interface 1100 illustrates, in particular, a search query that is based at least in part on event transaction tags, as discussed with respect to FIG. 10. The user interface 1100 may be presented on a display of the user device 106. The user interface 1100 may include a first view 1102, a second view 1104, and a third view 1105.

The user interface 1100 includes an input component 1106, which is an example of the input component 406. The user interface 1100 also includes a search input box 1108, which is an example of the search input box 408, at which text may be input. For example, as shown in the user interface view 1102, the user has begun inputting "tri" (e.g., search input 1109) into the search input box 1108. This input has caused the user device 106 to generate a set of suggested search queries 1110. These suggested search queries 1110 are essentially different ways to sort or otherwise filter the searching. The set of suggested search queries 1110 is based on transaction records that have been modified to include one or more transaction tags (e.g., event tags such as an event tag that defines a particular trip to New York).

As shown in the user interface view 1104, the user has selected the "Trip to New York . . . " suggested search query 1110, which has caused the user device 106 to conduct a tag-based search of transaction records on the user device that have been tagged with the Trip to New York tag (e.g., a type of event tag). This action has also caused the user device to generate a set of additional search queries 1116, which can be used to further refine the transaction records based, in this example, on locations/points of interest associated with the trip.

As shown in user interface view 1104, various categories of transaction records have been identified under category heading 1112 (e.g., food and drink and transportation). Similarly, a preview of a list of the relevant transaction records is presented under the transaction heading 1114. a single transaction record 412 has been identified.

The user interface view 1105 illustrates a list of all transactions 1118. For example, the user interface view 1105 may be presented responsive to user selection of the "see all" user interface element adjacent the transaction heading 1114. The user interface view 1105 summarizes the event transactions for the given time period (e.g., January 2-4; $596.05; 10 transactions; etc.).

Figure 12:
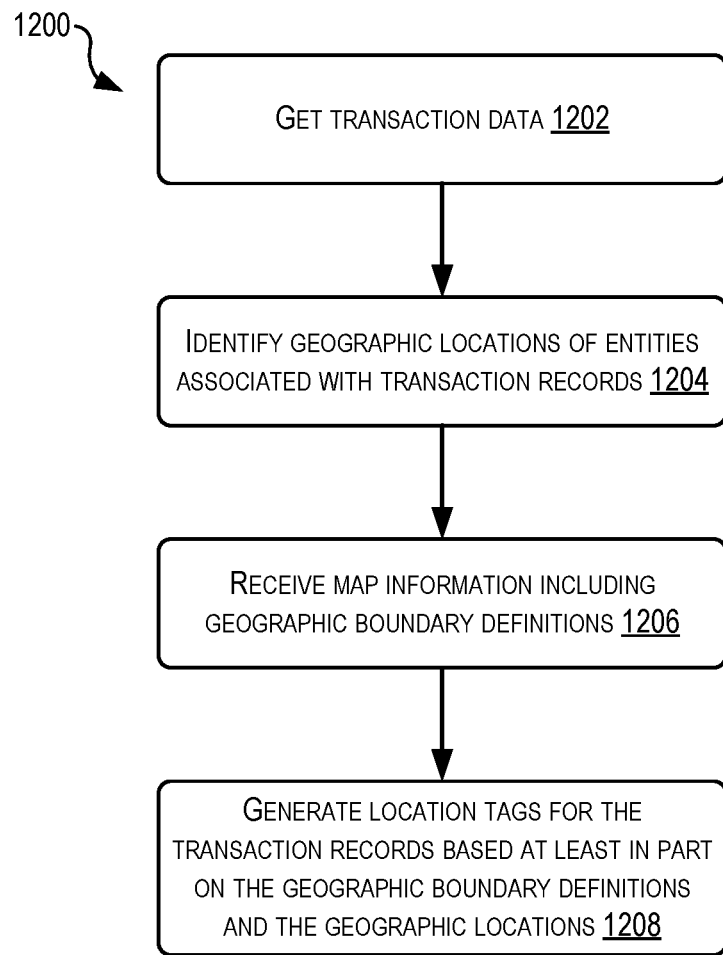
FIG. 12 illustrates a flowchart showing an example process for generating transaction tags for enhanced transaction searching, according to at least one example.

FIG. 12 illustrates a flowchart showing an example process 1200 for generating transaction tags for enhanced transaction searching, according to at least one example. The process 1200 may be performed by the user device 106 (FIG. 1) and in particular the location engine 228 (FIG. 2). The process 1200 may relate to an approach for generating transaction tags that define locations of where transactions occurred.

The process 1200 begins at 1202 by the user device 106 getting transaction data. This may be performed similarly as block 302.

At block 1204, the process 1200 includes the user device 106 identifying geographic locations of entities associated with transaction records. For example, this may include the user device 106 extracting latitude and longitude values from the transaction records to identify a set of locations where transactions have occurred.

At block 1206, the process 1200 includes the user device 106 receiving location information including geographic boundary definitions. The location information may be received from the location service of the service provider 104. The location information may include boundaries for specific points of interest (e.g., Pike Place Market, Golden Gate Bridge park, Times Square, Yellowstone National Park) and any other location (e.g., city, county, state, neighborhoods, etc.).

At block 1208, the process 1200 includes the user device 106 generating location tags for the transaction records based at least in part on the geographic boundary definitions and the geographic locations. For example, the location information defining the geographic boundaries may be cross-referenced with the geographic locations of the entities associated with the transaction records to identify whether any transactions occurred within a defined boundary. If so, a location tag may be generated and associated with the relevant record.

Figure 13:
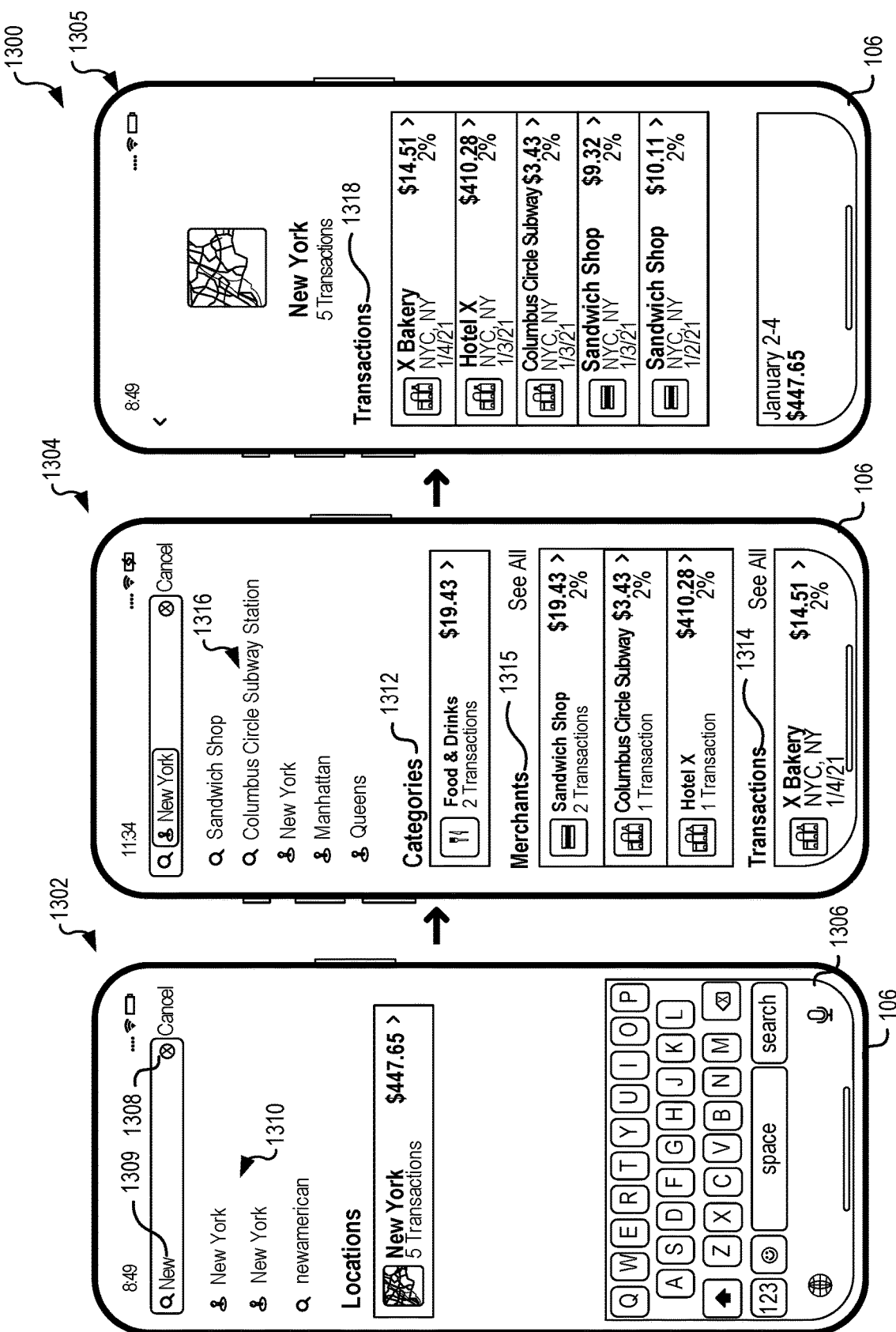
FIG. 13 illustrates an example user interface for enhanced transaction searching, according to at least one example.

FIG. 13 illustrates an example user interface 1300 for enhanced transaction searching, according to at least one example. The user interface 1300 is an example of the user interface 400. The user interface 1300 illustrates, in particular, a search query that is based at least in part on location transaction tags, as discussed with respect to FIG. 12. The user interface 1300 may be presented on a display of the user device 106. The user interface 1300 may include a first view 1302, a second view 1304, and a third view 1305.

The user interface 1300 includes an input component 1306, which is an example of the input component 406. The user interface 1300 also includes a search input box 1308, which is an example of the search input box 408, at which text may be input. For example, as shown in the user interface view 1302, the user has begun inputting "New" (e.g., search input 1309) into the search input box 1308. This input has caused the user device 106 to generate a set of suggested search queries 1310. These suggested search queries 1310 are essentially different ways to sort or otherwise filter the searching. The set of suggested search queries 1310 is based on transaction records that have been modified to include one or more transaction tags (e.g., location tags including New York).

As shown in the user interface view 1304, the user has selected the "New York" suggested search query 1310, which has caused the user device 106 to conduct a tag-based search of transaction records on the user device that have been tagged with the location of New York (e.g., a type of location tag). This action has also caused the user device 106 to generate a set of additional suggested search queries 1316, which can be used to further refine the transaction records based, in this example, on locations/points of interest associated with New York.

As shown in user interface view 1304, various categories of transaction records have been identified under category heading 1312 (e.g., food and drinks). Similarly, a preview of a list of the relevant transaction records is presented under the transaction heading 1314. Similarly, a preview of a list of merchants is presented under the merchant heading 1315.

The user interface view 1305 illustrates a list of all transactions 1318. For example, the user interface view 1305 may be presented responsive to user selection of the "see all" user interface element adjacent the transaction heading 1314. The user interface view 1305 summarizes the event transactions for the given time period (e.g., January 2-4; $447.65; 5 transactions; etc.) in New York.

Figure 14:
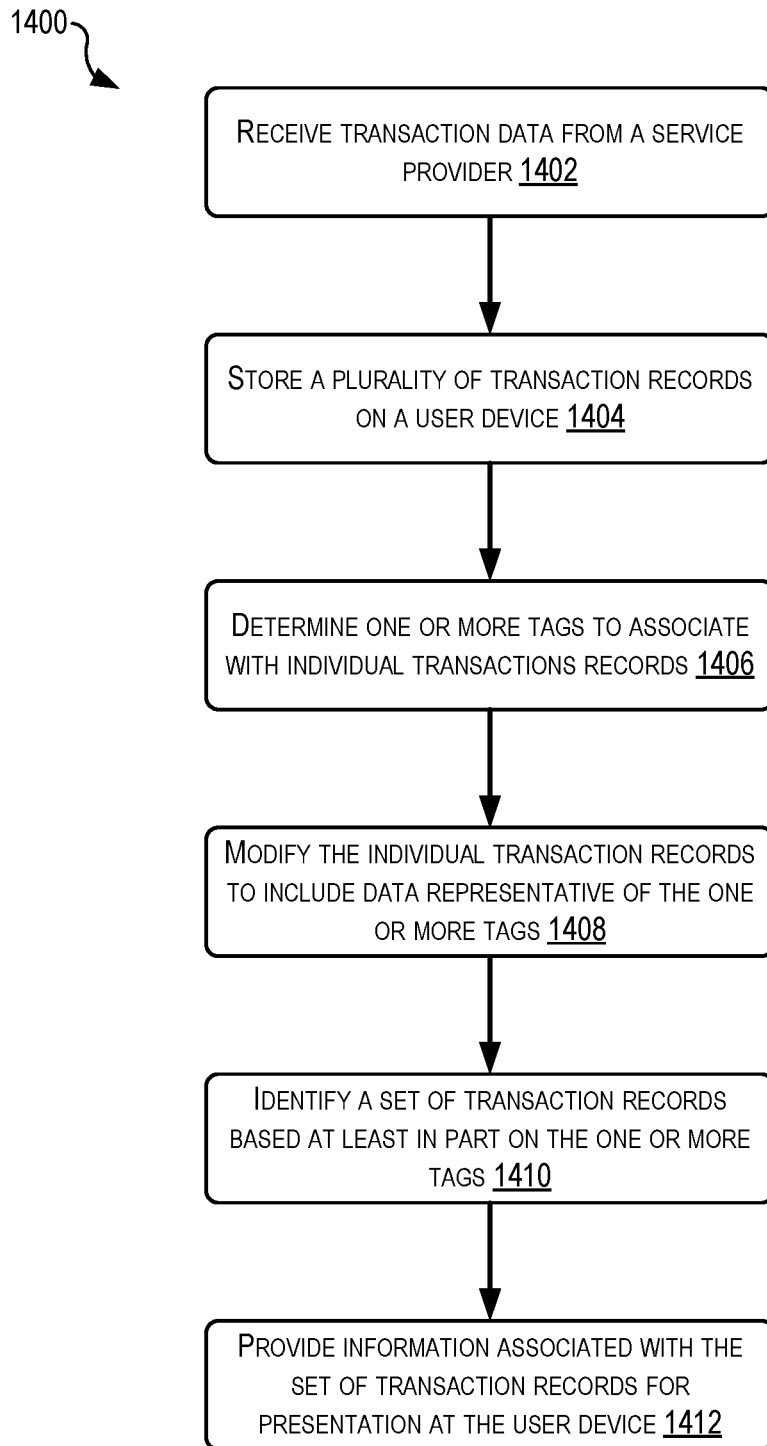
FIG. 14 illustrates a flowchart showing an example process for generating transaction tags for enhanced transaction searching, according to at least one example.

FIG. 14 illustrates a flowchart showing an example process 1400 for generating transaction tags for enhanced transaction searching, according to at least one example. The process 1400 may be performed by the user device 106 (FIG. 1).

The process 1400 begins at 1402 by the user device 106 receiving transaction data from a service provider. This may be received by the user device. The transaction data may include a plurality of transaction records each associated with an individual transaction and a plurality of characteristics. In some examples, each transaction record of the plurality of transaction records may be associated with a single transaction instrument.

At block 1404, the process 1400 includes the user device 106 storing the plurality of transaction records on the user device.

At block 1406, the process 1400 includes the user device 106 determining one or more tags to associate with individual transaction records. The individual transaction records may be of the plurality of transaction records. Determining the tags may be based at least in part on a subset of characteristics of the plurality of characteristics associated with the individual transaction records. In some examples, determining the one or more tags may include using a machine learning technique to identify associations between the plurality of transaction records. For example, a machine learning model may be trained using transaction records that have been tagged, either programmatically or by users. The model may then be used to ingest new transaction records and based on the characteristics of those records, pick which tags to apply to the records. In some examples, at least one of the one or more tags is defined by a user of the user device.

In some examples, the subset of characteristics may include a transaction amount, an entity identifier, and a transaction date. In some examples, the one or more tags indicate that the individual transactions are recurring transactions.

In some examples, the subset of characteristics may include a transaction date. In some examples, determining the one or more tags to associate with the individual transaction records may include receiving event information from a service on the user device. The event information may further identify an estimated beginning date for an event and an estimated end date of the event. In some examples, determining the one or more tags may further include identifying the individual transaction records as transactions having transaction dates occurring between the estimated beginning date and the estimated end date of the event.

In some examples, the subset of characteristics may include an entity identifier. In some examples, determining the one or more tags to associate with the individual transaction records may include receiving location information from a service. The location information may identify sets of products and services associated with entities associated with entity identifiers. In some examples, determining the one or more tags may include identifying the individual transaction records by comparing the entity identifier with the entity identifiers to identify a set of products or services offered by an entity identified by the entity identifier.

In some examples, the subset of characteristics may include a transaction location identifier. In some examples, determining the one or more tags to associate with the individual transaction records may include receiving location information from a service. The location information may identify a geographic boundary corresponding to a geographic location. In some examples, determining the one or more tags may further include identifying the individual transaction records by determining that the individual transactions occurred within the geographic boundary based at least in part on the location information and transaction location identifiers.

At block 1408, the process 1400 includes the user device 106 modifying the individual transaction records to include data representative of the one or more tags. In some examples, modifying the individual transaction records may include writing data representative of the one or more tags to individual portions of a data structure that stores the individual transaction records on the user device.

At block 1410, the process 1400 includes, responsive to receiving a request for transaction information, identifying a set of transaction records of the plurality of transaction records based at least in part on the one or more tags. In some examples, identifying the set of transaction records may include using an index defined by the one or more tags to filter the plurality of transaction records to identify the set of transaction records.

At block 1412, the process 1400 includes, responsive to receiving a request for transaction information, providing information associated with the set of transaction records for presentation at the user device.

In some examples, receiving the request for transaction information may include receiving a user input at a search interface; presenting, at the search interface, a set of predefined search queries based at least in part on the initial user input; and receiving a user selection of a predefined search query of the set of predefined search queries. The predefined search query may define the request for transaction information. In some examples, at least a portion of the set of predefined search queries may correspond to the individual transaction records.

In some examples, the request for transaction information may include a request for a certain type of transaction information. In this example, each transaction record of the set of transaction records includes the certain type of transaction information. In some examples, the one or more tags may be correlated with the certain type of transaction information.

In some examples, the process 1400 may further include generating a unique index for searching the plurality of transaction records based at least in part on the one or more tags. In this example, identifying the set of transaction records may include using the unique index to identify the set of transaction records.

In some examples, the process 1400 may further include receiving contextual information from a service that is local to the user device. In this example, determining the one or more tags may include determining the one or more tags based at least in part on the contextual information. In some examples, the contextual information may include at least one of a location information, product information, or event information. In some examples, the service may include a searching service configured to search user data stored across multiple applications on the user device.

Figure 15:
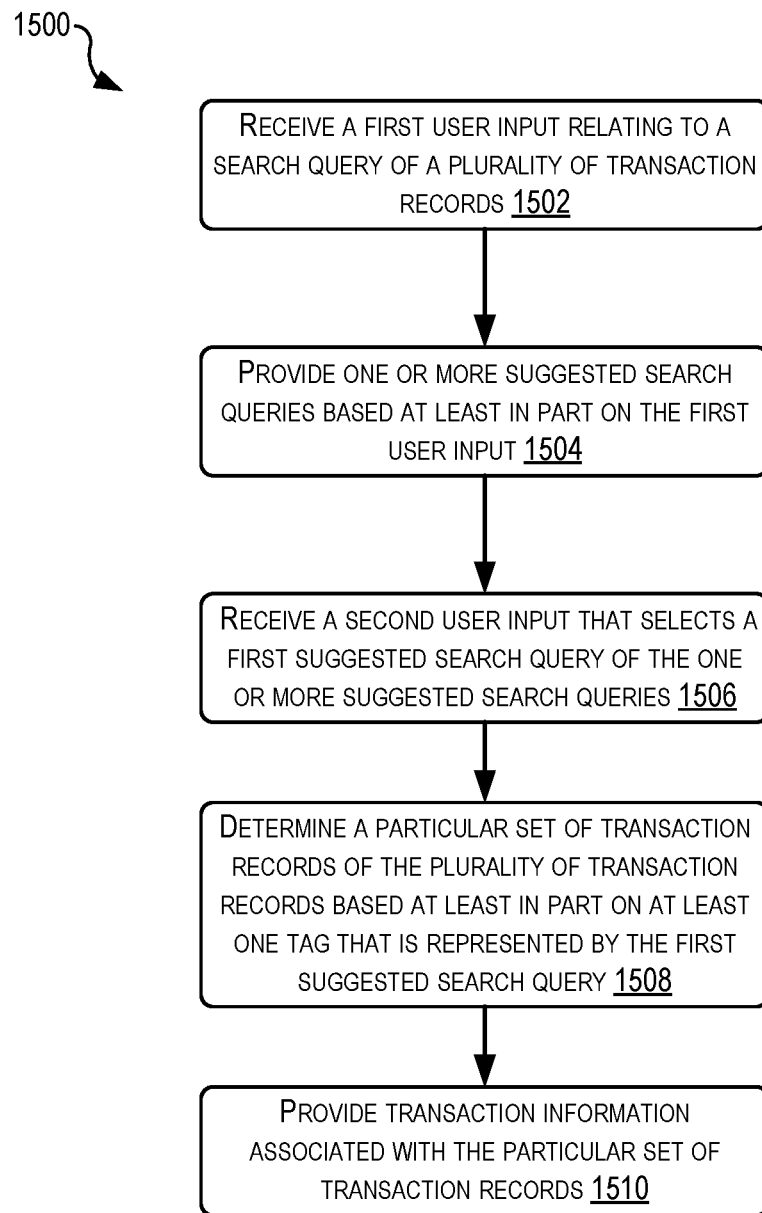
FIG. 15 illustrates a flowchart showing an example process for providing enhanced transaction searching using transaction tags, according to at least one example.

FIG. 15 illustrates a flowchart showing an example process 1500 for providing enhanced transaction searching using transaction tags, according to at least one example. The process 1500 may be performed by the user device 106 (FIG. 1).

The process 1500 begins at 1502 by the user device 106 receiving a first user input relating to a search query of a plurality of transaction records. The plurality of transaction records may be stored on the user device 106. The first input may be received via an input component of the user device 106.

At block 1504, the process 1500 includes the user device 106 providing one or more suggested search queries based at least in part on the first user input. The one or more suggested search queries may be provided for presentation at a display of the user device 106. In some examples, each suggested search query of the one or more suggested search queries may represent one or more tags that have been associated with a set of transaction records of the plurality of transaction records. In some examples, the set of transaction records is stored on the user device.

At block 1506, the process 1500 includes the user device 106 receiving a second user input that selects a first suggested search query of the one or more suggested search queries. The second user input may be received via the input component.

At block 1508, the process 1500 includes the user device 106 determining a particular set of transaction records of the plurality of transaction records based at least in part on at least one tag that is represented by the first suggested search query. In some examples, determining the particular set of transaction records may include conducting a search of the plurality of transaction records using the at least one tag as an index. In some examples, the at least one tag may be at least one of a threshold tag, category tag, a recurring tag, an event tag, or a location tag. In some examples, determining the particular set of transaction records is further based at least in part on an additional tag that is represented by the first suggested search query.

At block 1510, the process 1500 includes the user device 106 providing transaction information associated with the particular set of transaction records. This may be provided for presentation at the display. In some examples, providing the transaction information for presentation may include providing a category total that identifies a category associated with at least one transaction record of the particular set of transaction records and a category total amount associated with the category. In some examples, the at least one tag may include a category tag that identifies a type of good or service associated with an entity of the at least one transaction record. In some examples, providing the transaction information for presentation may include providing a transaction record list that includes the particular set of transaction records, and a transaction total amount associated with the particular set of transaction records. In some examples, the transaction information individually identifies the particular set of transaction records and a grouping of at least some of the particular set of transaction records.

In some examples, the process 1500 may further include providing, for presentation at the display, an additional suggested search query based at least in part on the second user input, receiving, via the input component, a third user input that selects the additional suggested search query, determining a subset of transaction records of the particular set of transaction records based at least in part on at least one different tag that is represented by the additional suggested search query, and providing, for presentation at the display, updated transaction information associated with the subset of transaction records.

In some examples, the process 1500 may further include, prior to receiving the first user input, generating the one more tags based at least in part on two or more characteristics of the set of transaction records. In some examples, the process 1500 may further include modifying the set of transaction records to include the one or more tags.

In some examples, the process 1500 may further include generating the one or more tags based at least in part on contextual information that is independent of the plurality of transaction records.

In some examples, the plurality of transaction records is associated with a single transaction instrument, a plurality of transaction instruments, or a plurality of different transaction instruments.

Figure 16:
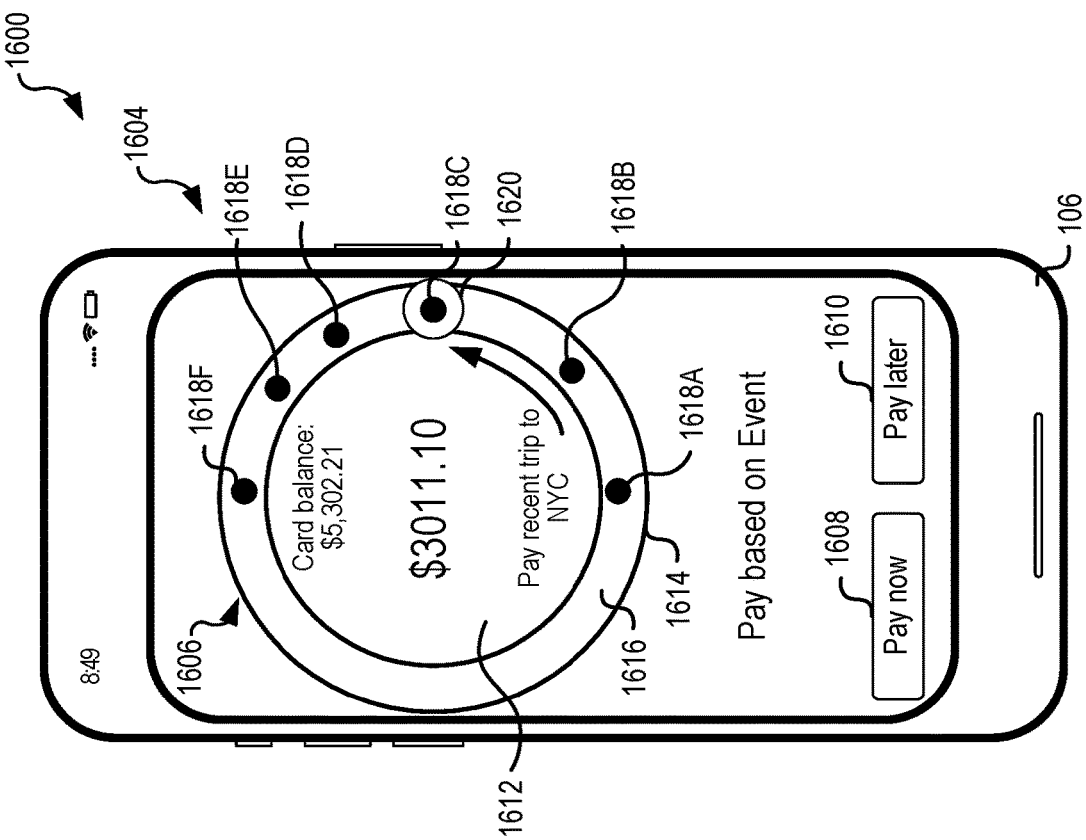
FIG. 16 illustrates an example user interface for tag-based transaction payment suggestions, according to at least one example.
Figure 16:
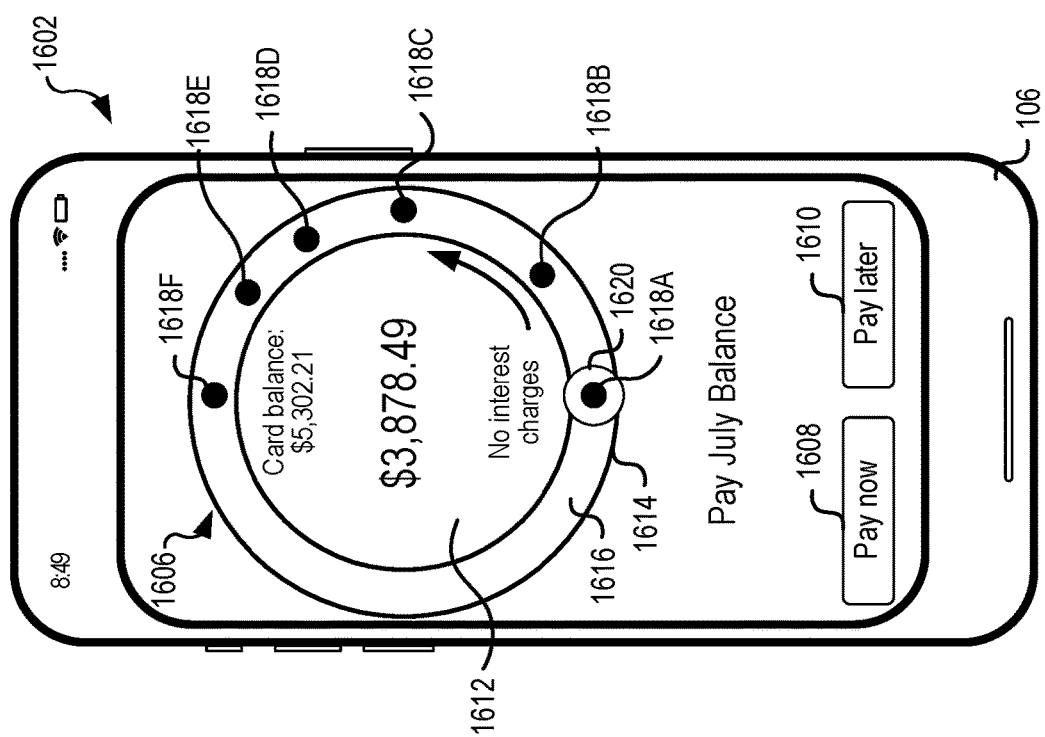

FIG. 16 illustrates an example user interface 1600 for tag-based transaction payment suggestions, according to at least one example. The user interface 1600 may be presented by an application of the user device 106 such as a payment application, and the content may be generated by an engine (e.g., the other engine 230) of the transaction tagging engine 214). In some examples, the user interface 1600 may be considered a payment suggestion user interface as it includes suggestions for payment of an account such as a credit card account. In some examples, the transactions that resulted in a card balance identified in the user interface 1600 may be the same transactions discussed with respect to previous figures. In particular, the user device 106 may obtain the transaction records from a server or maintain its own records of the transactions, may tag the transaction records using the techniques described herein, then use the tagged transactions to generate various suggestions for paying different amounts of the card balance. In this example, the card balance is $5,302.21. As introduced, the user interface 1600 may be presented on a display of the user device 106. The user interface 1600 may include a view 1602 and a view 1604.

The user interface 1600 includes an annular user interface element 1606, a pay now button 1608, and a pay later button 1610. The annular user interface element 1606 may be used to display various payment-related information and suggested payments. The annular user interface element 1606 includes an inner circle 1612, surrounded by an outer circle 1614 that with a circumference of the inner circle 1612 defines a payment suggestion area 1616. In some examples, the inner circle 1612 and the outer circle 1614 are concentric. Other variations of circular and non-circular elements may also be used to make up the user interface element 1606, depending on the example.

The payment suggestion area 1616 includes a plurality of payment suggestion indicators 1618A-1618F disposed circumferentially and radially with respect to the inner circle 1612. In some examples, the payment suggestion area 1616 may include more or fewer payment suggestion indicators 1618, which may depend on the composition of the transaction records used to generate the payment suggestions. In practice, each payment suggestion indicator 1618 may correspond to a suggested approach for paying towards the card balance. As illustrated, the payment suggestion indicators 1618 may be organized in descending order in terms of amount (e.g., 1618A being the largest and 1618F being the smallest). In some examples, the payment suggestion indicators 1618 may have different orders and/or may be arbitrarily placed into the payment suggestion area 1616.

The inner circle 1612 may be used to present payment-related information. For example, the inner circle 1612 identifies a total card balance (e.g., an account balance) of $5,302.21. The inner circle 1612 also identifies a payment note (e.g., "no interest charges") in the view 1602 and a payment amount (e.g., $3,878.49) in the view 1602. At least some of the information in the inner circle 1612 may change, depending on a selected suggested payment, as described herein (e.g., see the view 1602, 1604, 1622, and 1624).

The payment suggestion area 1616 also includes a moveable selector 1620, which can be used to select one of the payment suggestion indicators 1618. The moveable selector 1620 may be slidably moved within the payment suggestion area 1616 (e.g., within a circular track defined by the payment suggestion area 1616) between the different payment suggestion indicators 1618 to select one indicator 1618. For example, as the moveable selector 1620 is moved, it may snap to the nearest payment suggestion indicator 1618 and/or may snap to the next payment suggestion indicator 1618 once a prior indicator has been passed. A user may move the moveable selector 1620 by interacting with a touch interface at the user device 106.

In some examples, other graphical elements of the payment suggestion area 1616 may change as the moveable selector 1620 moves between the payment suggestion indicators 1618. For example, a color of the portion of the payment suggestion area 1616 to the right of the selected payment suggestion indicator, which is 1618A in view 1602, and to the right of the last payment suggestion indicator 1618F may be a first color and the opposite portion (e.g., otherhalf of the circle) may be a second color. In some examples, the first color may change as the moveable selector 1620 is moved, depending on a payment amount associated with the corresponding payment suggestion and/or a location of the moveable selector 1620 within the payment suggestion area 1616. For example, when the amount is the highest, as illustrated as "$3,878.49" in the view 1602, the color may be green, indicating that the payment will make a large impact on the card balance. When the impact is lower (e.g., the amount is lower, as shown in the view 1604, 1622, and 1624), the color may transition from green, to yellow, to orange, and then to red, thereby indicating that the impact of a "red" payment towards the card balance will be less. Other variations are also possible, including those that do not include color coding and/or include a different variation of colors, graphics, fills, and the like.

In some examples, other graphical elements of the inner circle 1612 may change as the moveable selector 1620 moves between the payment suggestion indicators 1618. As introduced herein and shown with respect to other views, the amount of the payment and the payment note may change. For example, as shown in the view 1604, the moveable selector 1620 has been moved (e.g., via a user input) to select the payment suggestion indicator 1618C. As a result, the payment-related information in the inner circle 1612 has been updated to include information associated with the suggested payment represented by the payment suggestion indicator 1618C (e.g., a payment amount of $3,011.10 and a note that the payment amount is to pay for a recent trip to NYC). In some examples, other information on the view 1604, including in the area between the buttons 1608 and 1610 and the annular user interface element 1606 is also updated. The information in this area now indicates that the payment would be based on an Event, which in this case includes transactions tagged with an event tag relating to a trip to New York City. As described herein, the tagged transaction records may be used by the user device 106 to generate the suggested payments and populate the information into the user interface 1600.

Figure 17:
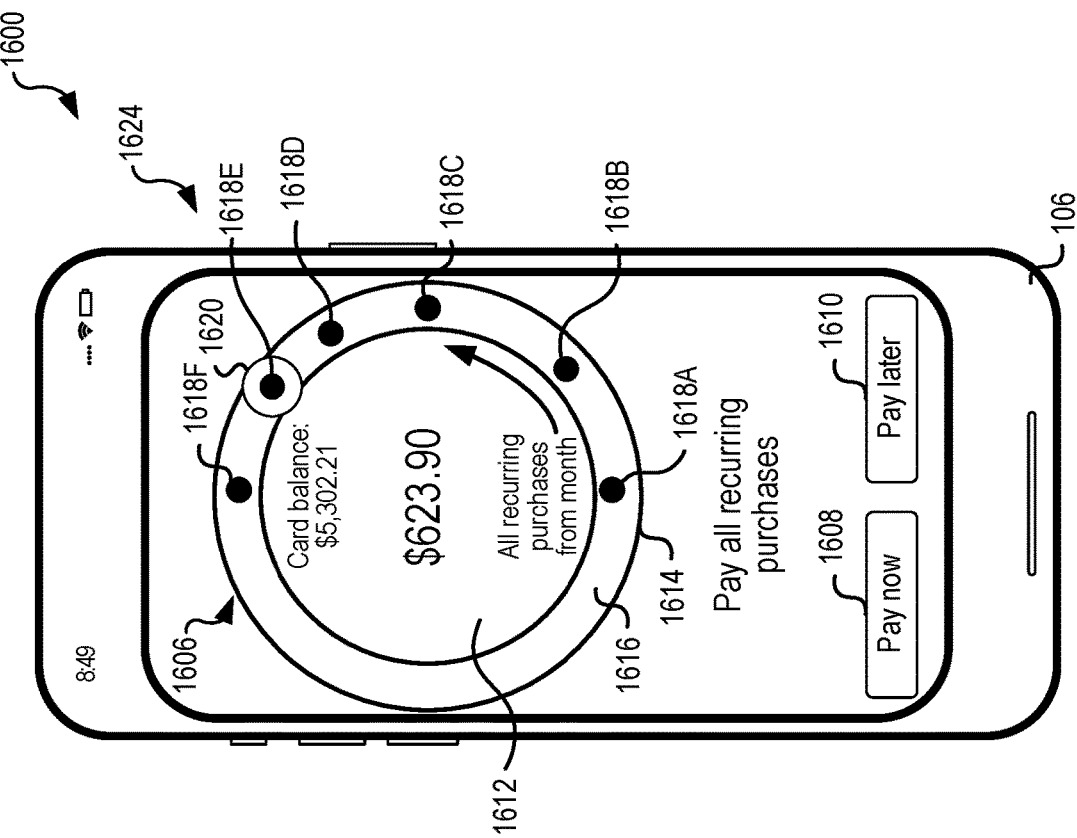
FIG. 17 illustrates additional views of the example user interface of FIG. 16 for tag-based transaction payment suggestions, according to at least one example.
Figure 17:
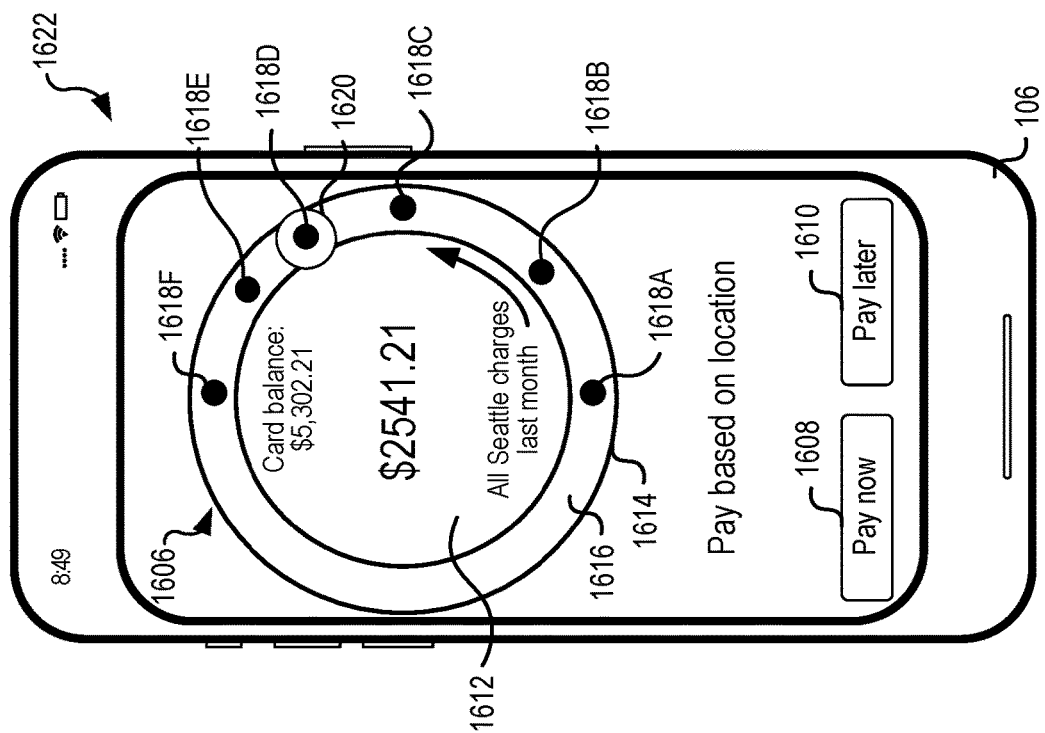

FIG. 17 illustrates additional views 1622 and 1624 of the user interface 1600 for tag-based transaction payment suggestions, according to at least one example. The views 1624 and 1626 represent selections of different payment suggestions (e.g., via the payment suggestion indicators 1618) using the moveable selector 1620. For example, as shown in the view 1622, the moveable selector 1620 has been moved (e.g., via a user input) to select the payment suggestion indicator 1618D. As a result, the payment-related information in the inner circle 1612 has been updated to include information associated with the suggested payment represented by the payment suggestion indicator 1618D (e.g., a payment amount of $2,541.21 and a note that the payment amount is to pay all Seattle charges in the last month). In some examples, other information on the view 1604, including in the area between the buttons 1608 and 1610 and the annular user interface element 1606 is also updated. The information in this area now indicates that the payment would be based on location, which in this case includes transactions tagged as occurring within Seattle city. As described herein, the tagged transaction records may be used by the user device 106 to generate the suggested payments and populate the information into the user interface 1600.

As shown in the view 1624, the moveable selector 1620 has been moved (e.g., via a user input) to select the payment suggestion indicator 1618E. As a result, the payment-related information in the inner circle 1612 has been updated to include information associated with the suggested payment represented by the payment suggestion indicator 1618E (e.g., a payment amount of $623.90 and a note that the payment amount is to pay all recurring purchases from last month). In some examples, other information on the view 1604, including in the area between the buttons 1608 and 1610 and the annular user interface element 1606 is also updated. The information in this area now indicates that payment is for all recurring purchases, which in this case includes transactions tagged as being recurring over the last month, as described herein. As described herein, the tagged transaction records may be used by the user device 106 to generate the suggested payments and populate the information into the user interface 1600.

In some examples, the other payment suggestion indicators 1618 depicted in the user interface 1600, along with those not shown, may correspond to a specific type of transaction-based payment suggestion. Other examples include those based on specific products, types, or categories (e.g., coffee, fuel, etc.), at specific retailers (e.g., Target), and the like. In some examples, the payment suggestions may be based on certain minimum payments that are specific to the account. For example, one suggestion may be to pay the minimum payment due (e.g., $30) plus some transaction-based amount (e.g., all small purchasers under $5). In some examples, the amounts of payment suggestions may depend, at least in part, on user input. For example, a user may indicate that they always want a suggestion to pay for travel-related expenses. In some examples, one of the search interfaces from earlier figures (e.g., FIGS. 4, 7, 9, 11, and/or 13) may be used by a user to generate the user interface 1600. For example, the user may search for a particular type of transaction using the transaction-tag based search, which may then give the user an option to use the results of that search to prepare a payment on the account to which the transactions were recorded. This option may include populating the user interface 1600 or may be performed without populating a user interface like 1600. For example, the option for payment be accessed from a button on one of the search user interfaces, which would begin the process of creating a payment based on the results shown in the search user interface.

In some examples, the user device 106 may determine and present a payment suggestion that includes a last payment plus smallest category type. As the name of the suggestion implies, the suggestion may be defined by the summation of all payments made during the last statement period plus the value of all transactions associated with a smallest category of transactions from the present statement period. In some examples, the user device 106 may determine a last payment suggestion by combining all of the payments made during the previous statement period. The user device 106 may then analyze categories (identified by tags) associated with the collection of transactions in the statement period to identify a smallest category from the categories associated with the collection of transactions. The total of all transactions associated with the smallest category is less than a total of all transactions associated with any other analyzed category. The user device 106 can then determine the last payment plus smallest category suggestion by combining the last payment milestone with the total of all transactions associated with the smallest category of transactions.

The last payment suggestion can be useful to include in the user interface 1600 when a user is trying to pay down their statement balance and at the same time is trying to spend less. The last payment suggestion can be used to encourage a user to continue to make payments at least as large as the payment they made in response to a previous statement. In some examples, the user device 106 will not select any payment suggestions for inclusion on the user interface 1600 that are less than the last payment suggestion.

In some examples, the last payment plus smallest category suggestion can be useful to include on the user interface 1600 when a user's balance is growing. This suggestion can be presented to encourage a user to both pay a small amount more than the amount they paid in response to the previous statement, but also encourage the reduction in spending by subtly suggesting that they may be able to do without purchases in this smallest category.

Figure 18:
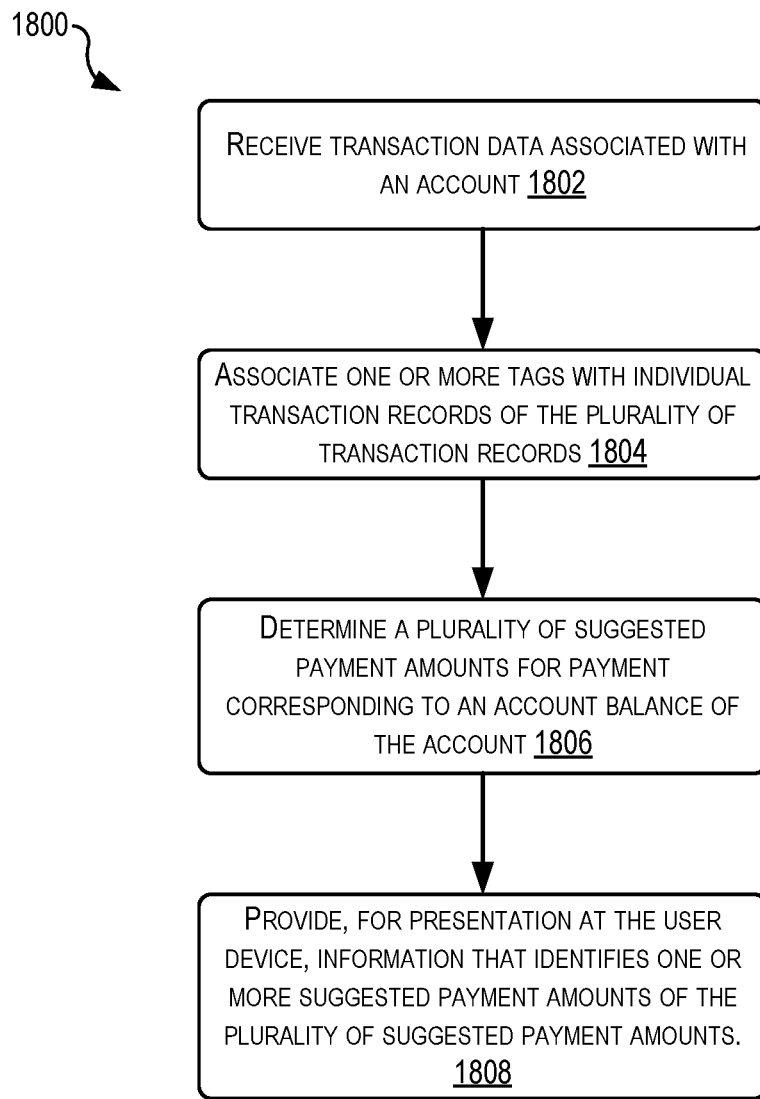
FIG. 18 illustrates a flowchart showing an example process for tag-based transaction payment suggestions, according to at least one example.

FIG. 18 illustrates a flowchart showing an example process 1800 for tag-based transaction payment suggestions, according to at least one example. The process 1800 may be performed by the user device 106 (FIG. 1) using the user interface 1600.

The process 1800 begins at 1802 by the user device 106 receiving, from a service provider, transaction data associated with an account. The account may be a payment account associated with a user account of the user device (e.g., associated with a user of the user device 160). The transaction data may include a plurality of transaction records each associated with an individual transaction and a plurality of characteristics. Each transaction record may represent a single transaction. In some examples, the plurality of transaction records may be limited to a certain time period (e.g., a billing period associated with the account, all outstanding transactions, and the like). In some examples, transactions that have been paid for may be excluded and/or flagged as such. In some examples, each transaction record of the plurality of transaction records may be associated with a single transaction instrument and/or account (e.g., a single credit card or more credit cards associated with the same account).

At block 1804, the process 1800 includes the user device 106 associating one or more tags with individual transaction records of the plurality of transaction records. This may be based at least in part on a subset of characteristics of the plurality of characteristics associated with the individual transaction records. Associating tags with transaction records has been described in detail with earlier figures.

In some examples, associating the one or more tags with the individual transaction records may include storing the plurality of transaction records on the user device, determining the one or more tags based at least in part on the subset of characteristics of the plurality of characteristics associated with the individual transaction records, and modifying the individual transaction records to include data representative of the one or more tags.

In some examples, the process 1800 may further include receiving contextual information from a service that is local to the user device. In this example, associating the one or more tags may include determining the one or more tags based at least in part on the contextual information. In some examples, the contextual information may include at least one of location information, product information, or event information. In some examples, the service may include a searching service configured to search user data stored across multiple applications on the user device.

At block 1806, the process 1800 includes the user device 106 determining a plurality of suggested payment amounts for payment corresponding to an account balance of the account. This may be based at least in part on the individual transaction records associated with the one or more tags and account information associated with the account.

At block 1808, the process 1800 includes the user device 106 providing, for presentation at the user device, information that identifies one or more suggested payment amounts of the plurality of suggested payment amounts. In some examples, the one or more suggested payment amounts may define one or more custom payment amounts each of which includes a minimum payment amount and a suggested payment of the one or more payment amounts. In some examples, the one or more suggested payment amounts may correspond to one or more of a first set of tagged recurring transactions, a second set of tagged transactions within a geographic location, a third set of tagged event-based transactions, a fourth set of tagged category-based transactions, a fifth set of tagged merchant type transactions, or a sixth set of tagged product-type transactions.

In some examples, providing the information that identifies the one or more suggested payment amounts of the plurality of suggested payment amounts may include providing the information responsive to a user input that requests the information.

In some examples, the transaction data may correspond to a statement period. In this example, providing the information that identifies the one or more suggested payment amounts may include providing a statement that includes the one or more suggested payment amounts. The statement may be provided using an application executing on the user device 106. In some examples, the statement may be presented on a display of the user device 106 and include information about the account. In some examples, the statement may include a payment suggestion user interface (e.g., the user interface 1600) that identifies the one or more suggested payment amounts (e.g., using the payment suggestion indicators 1618).

In some examples, wherein providing the information may include generating a payment suggestion user interface (e.g., the user interface 1600) that identifies the or more suggested payment amounts (e.g., using the payment suggestion indicators 1618), and providing the payment suggestion user interface for presentation at a display of the user device. In some examples, the payment suggestion user interface may include an annular user interface element and one or more payment suggestion user interface elements disposed circumferentially with respect to the annular user interface element.

In some examples, the account information may identify a statement period. In this example, determining the plurality of suggested payment amounts for payment corresponding to the account balance of the account may include aggregating a first set of transactions conducted during the statement period based at least in part on a first set of tags, determining a first suggested payment amount based at least in part on first transaction information associated with the first set of transactions, aggregating a second set of transactions conducted during the statement period based at least in part on a second set of tags, and determining a second suggested payment amount based at least in part on second transaction information associated with the second set of transactions.

Figure 19:
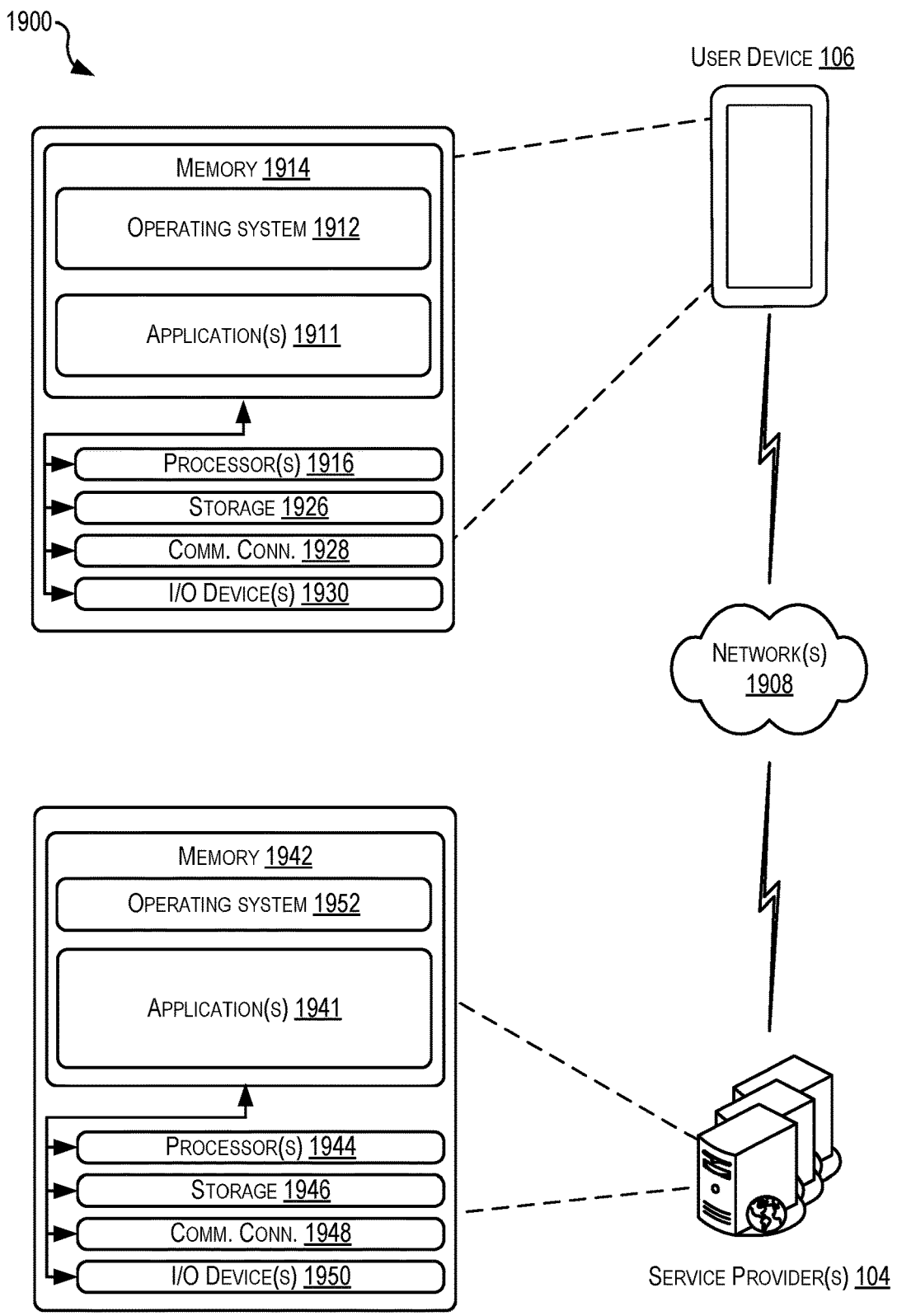
FIG. 19 illustrates a simplified block diagram depicting an example architecture for implementing the techniques described herein, according to at least one example.

FIG. 19 illustrates an example architecture or environment 1900 configured to implement techniques described herein, according to at least one example. In some examples, the example architecture 1900 may further be configured to enable a user device 106 and service provider computer 104 to share information. In some examples, the devices may be connected via one or more networks 1908 (e.g., via Bluetooth, WiFi, the Internet, or the like). In some examples, the service provider computer 104 may be configured to implement at least some of the techniques described herein with reference to the user device 106.

In some examples, the networks 1908 may include any one or a combination of many different types of networks, such as cable networks, the Internet, wireless networks, cellular networks, satellite networks, other private and/or public networks, or any combination thereof. While the illustrated example represents the user device 106 accessing the service provider computer 104 via the networks 1908, the described techniques may equally apply in instances where the user device 106 interacts with the service provider computer 104 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer configurations, etc.).

As noted above, the user device 106 may be any type of computing device such as, but not limited to, a mobile phone, a smartphone, a personal digital assistant (PDA), a laptop computer, a desktop computer, a thin-client device, a tablet computer, a wearable device such as a smart watch, or the like. In some examples, the user device 106 may be in communication with the service provider computer 104 via the network 1908, or via other network connections.

In one illustrative configuration, the user device 106 may include at least one memory 1914 and one or more processing units (or processor(s)) 1916. The processor(s) 1916 may be implemented as appropriate in hardware, computer-executable instructions, firmware, or combinations thereof. Computer-executable instruction or firmware implementations of the processor(s) 1916 may include computer-executable or machine-executable instructions written in any suitable programming language to perform the various functions described. The user device 106 may also include geo-location devices (e.g., a global positioning system (GPS) device or the like) for providing and/or recording geographic location information associated with the user device 106.

The memory 1914 may store program instructions that are loadable and executable on the processor(s) 1916, as well as data generated during the execution of these programs. Depending on the configuration and type of the user device 106, the memory 1914 may be volatile (such as random access memory (RAM)) and/or non-volatile (such as read-only memory (ROM), flash memory, etc.). The user device 106 may also include additional removable storage and/or non-removable storage 1926 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1914 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 1914 and the additional storage 1926, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 1914 and the additional storage 1926 are both examples of non-transitory computer storage media. Additional types of computer storage media that may be present in the user device 106 may include, but are not limited to, phase-change RAM (PRAM), SRAM, DRAM, RAM, ROM, Electrically Erasable Programmable Read-Only Memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 106. Combinations of any of the above should also be included within the scope of non-transitory computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

The user device 106 may also contain communications connection(s) 1928 that allow the user device 106 to communicate with a data store, another computing device or server, user terminals, and/or other devices via the network 1908. The user device 106 may also include I/O device(s) 1930, such as a keyboard, a mouse, a pen, a voice input device, a touch screen input device, a display, speakers, a printer, etc.

Turning to the contents of the memory 1914 in more detail, the memory 1914 may include an operating system 1912 and/or one or more application programs or services for implementing the features disclosed herein such as applications 1911 (e.g., the transaction tagging engine 214, digital wallet, third-party applications, browser application, etc.). In some examples, the service provider computer 104 may also include a health application to perform similar techniques as described with reference to the user device 106. Similarly, at least some techniques described with reference to the service provider computer 104 may be performed by the user device 106.

The service provider computer 104 may also be any type of computing device such as, but not limited to, a collection of virtual or "cloud" computing resources, a remote server, a mobile phone, a smartphone, a PDA, a laptop computer, a desktop computer, a thin-client device, a tablet computer, a wearable device, a server computer, a virtual machine instance, etc. In some examples, the service provider computer 104 may be in communication with the user device 106 via the network 1908, or via other network connections.

In one illustrative configuration, the service provider computer 104 may include at least one memory 1942 and one or more processing units (or processor(s)) 1944. The processor(s) 1944 may be implemented as appropriate in hardware, computer-executable instructions, firmware, or combinations thereof. Computer-executable instruction or firmware implementations of the processor(s) 1944 may include computer-executable or machine-executable instructions written in any suitable programming language to perform the various functions described.

The memory 1942 may store program instructions that are loadable and executable on the processor(s) 1944, as well as data generated during the execution of these programs. Depending on the configuration and type of service provider computer 104, the memory 1942 may be volatile (such as RAM) and/or non-volatile (such as ROM, flash memory, etc.). The service provider computer 104 may also include additional removable storage and/or non-removable storage 1946 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 1942 may include multiple different types of memory, such as SRAM, DRAM, or ROM. While the volatile memory described herein may be referred to as RAM, any volatile memory that would not maintain data stored therein, once unplugged from a host and/or power, would be appropriate. The memory 1942 and the additional storage 1946, both removable and non-removable, are both additional examples of non-transitory computer-readable storage media.

The service provider computer 104 may also contain communications connection(s) 1948 that allow the service provider computer 104 to communicate with a data store, another computing device or server, user terminals and/or other devices via the network 1908. The service provider computer 104 may also include I/O device(s) 1950, such as a keyboard, a mouse, a pen, a voice input device, a touch input device, a display, speakers, a printer, etc.

Turning to the contents of the memory 1942 in more detail, the memory 1942 may include an operating system 1952 and/or one or more application programs 1941 or services for implementing the features disclosed herein including, for example, the transaction tagging engine 214.

In the following, further clauses are described to facilitate the understanding of the present disclosure.

Clause 1. A computer-implemented method, comprising:
receiving, at a user device, transaction data from a service provider, the transaction data comprising a plurality of transaction records each associated with an individual transaction and a plurality of characteristics;
storing the plurality of transaction records on the user device;
determining one or more tags to associate with individual transaction records of the plurality of transaction records based at least in part on a subset of characteristics of the plurality of characteristics associated with the individual transaction records;
modifying the individual transaction records to include data representative of the one or more tags; and
responsive to receiving a request for transaction information:
identifying a set of transaction records of the plurality of transaction records based at least in part on the one or more tags; and
providing information associated with the set of transaction records for presentation at the user device.

Clause 2. The computer-implemented method of clause 1, further comprising generating a unique index for searching the plurality of transaction records based at least in part on the one or more tags, and wherein identifying the set of transaction records comprises using the unique index to identify the set of transaction records.

Clause 3. The computer-implemented method of clause 1, wherein the subset of characteristics comprises a transaction amount, an entity identifier, and a transaction date, and wherein the one or more tags indicate that the individual transactions records represent recurring transactions.

Clause 4. The computer-implemented method of clause 1, wherein the subset of characteristics comprises a transaction date, and wherein determining the one or more tags to associate with the individual transaction records comprises:
receiving event information from a service on the user device, the event information identifying an estimated beginning date for an event and an estimated end date of the event; and
identifying the individual transaction records as transactions having transaction dates occurring between the estimated beginning date and the estimated end date of the event.

Clause 5. The computer-implemented method of clause 1, wherein the subset of characteristics comprises an entity identifier, and wherein determining the one or more tags to associate with the individual transaction records comprises:
receiving location information from a service, the location information identifying sets of products and services associated with entities associated with entity identifiers; and
identifying the individual transaction records by comparing the entity identifier with the entity identifiers to identify a set of products or services offered by an entity identified by the entity identifier.

Clause 6. The computer-implemented method of clause 1, wherein the subset of characteristics comprises a transaction location identifier, and wherein determining the one or more tags to associate with the individual transaction records comprises:
receiving location information from a service, the location information identifying a geographic boundary corresponding to a geographic location; and
identifying the individual transaction records by determining that the individual transactions occurred within the geographic boundary based at least in part on the location information and transaction location identifiers.

Clause 7. The computer-implemented method of clause 1, wherein modifying the individual transaction records comprises writing data representative of the one or more tags to individual portions of a data structure that stores the individual transaction records on the user device.

Clause 8. One or more non-transitory computer-readable media comprising computer-executable instructions that, when executed by one or more processors, cause a user device to perform operations, comprising:
receiving, at the user device, transaction data from a service provider, the transaction data comprising a plurality of transaction records each associated with an individual transaction and a plurality of characteristics;

storing the plurality of transaction records on the user device;

determining one or more tags to associate with individual transaction records of the plurality of transaction records based at least in part on a subset of characteristics of the plurality of characteristics associated with the individual transaction records;

modifying the individual transaction records to include data representative of the one or more tags; and responsive to receiving a request for transaction information:

identifying a set of transaction records of the plurality of transaction records based at least in part on the one or more tags; and providing information associated with the set of transaction records for presentation at the user device.

Clause 9. The one or more non-transitory computer-readable media of clause 8, wherein each transaction record of the plurality of transaction records is associated with a single transaction instrument.

Clause 10. The one or more non-transitory computer-readable media of clause 8, further comprising additional computer executable instructions that, when executed by the one or more processors, cause the user device to perform additional operations comprising receiving contextual information from a service that is local to the user device, and wherein determining the one or more tags comprises determining the one or more tags based at least in part on the contextual information.

Clause 11. The one or more non-transitory computer-readable media of clause 10, wherein the contextual information comprises at least one of location information, product information, or event information.

Clause 12. The one or more non-transitory computer-readable media of clause 10, wherein the service comprises a searching service configured to search user data stored across multiple applications on the user device.

Clause 13. The one or more non-transitory computer-readable media of clause 8, wherein receiving the request for transaction information comprises:

receiving a user input at a search interface;

presenting, at the search interface, a set of predefined search queries based at least in part on the user input; and receiving a user selection of a predefined search query of the set of predefined search queries, the predefined search query defining the request for transaction information.

Clause 14. The one or more non-transitory computer-readable media of clause 13, wherein at least a portion of the set of predefined search queries corresponds to the individual transaction records.

Clause 15. The one or more non-transitory computer-readable media of clause 8, wherein the request for transaction information comprises a request for a certain type of transaction information, and wherein each transaction record of the set of transaction records includes the certain type of transaction information.

Clause 16. The one or more non-transitory computer-readable media of clause 15, wherein the one or more tags are correlated with the certain type of transaction information.

Clause 17. A user device, comprising:

a display;

a memory configured to store computer-executable instructions; and a processor configured to access the memory and execute the computer-executable instructions to at least:

receive transaction data from a service provider, the transaction data comprising a plurality of transaction records each associated with an individual transaction and a plurality of characteristics;

store the plurality of transaction records on the user device;

determine one or more tags to associate with individual transaction records of the plurality of transaction records based at least in part on a subset of characteristics of the plurality of characteristics associated with the individual transaction records;

modify the individual transaction records to include data representative of the one or more tags; and responsive to receiving a request for transaction information:

identify a set of transaction records of the plurality of transaction records based at least in part on the one or more tags; and provide information associated with the set of transaction records for presentation at the display.

Clause 18. The user device of clause 17, wherein determining the one or more tags comprises using a machine learning technique to identify associations between the plurality of transaction records.

Clause 19. The user device of clause 17, wherein at least one of the one or more tags is defined by a user of the user device.

Clause 20. The user device of clause 17, wherein identifying the set of transaction records comprises using an index defined by the one or more tags to filter the plurality of transaction records to identify the set of transaction records.

Clause 21. A computer-implemented method, comprising:

receiving, at a user device and from a service provider, transaction data associated with an account, the transaction data comprising a plurality of transaction records each associated with an individual transaction and a plurality of characteristics;

associating one or more tags with individual transaction records of the plurality of transaction records based at least in part on a subset of characteristics of the plurality of characteristics associated with the individual transaction records;

determining a plurality of suggested payment amounts for payment corresponding to an account balance of the account based at least in part on the individual transaction records associated with the one or more tags and account information associated with the account; and providing, for presentation at the user device, information that identifies one or more suggested payment amounts of the plurality of suggested payment amounts.

Clause 22. The computer-implemented method of clause 21, wherein the transaction data corresponds to a statement period, and wherein providing the information that identifies the one or more suggested payment amounts comprises providing a statement that includes the one or more suggested payment amounts.

Clause 23. The computer-implemented method of clause 22, wherein the statement comprises a payment suggestion user interface that identifies the one or more suggested payment amounts.

Clause 24. The computer-implemented method of clause 21, wherein providing the information comprises:

generating a payment suggestion user interface that identifies the or more suggested payment amounts; and providing the payment suggestion user interface for presentation at a display of the user device.

Clause 25. The computer-implemented method of clause 24, wherein the payment suggestion user interface comprises an annular user interface element and one or more payment suggestion user interface elements disposed circumferentially with respect to the annular user interface element.

Clause 26. The computer-implemented method of clause 21, wherein the account information identifies a statement period, and wherein determining the plurality of suggested payment amounts for payment corresponding to the account balance of the account comprises:
    aggregating a first set of transactions conducted during the statement period based at least in part on a first set of tags;
    determining a first suggested payment amount based at least in part on first transaction information associated with the first set of transactions;
    aggregating a second set of transactions conducted during the statement period based at least in part on a second set of tags; and
    determining a second suggested payment amount based at least in part on second transaction information associated with the second set of transactions.

Clause 27. The computer-implemented method of clause 21, wherein the one or more suggested payment amounts define one or more custom payment amounts each of which includes a minimum payment amount and a suggested payment of the one or more payment amounts.

Clause 28. The computer-implemented method of clause 21, wherein the one or more suggested payment amounts correspond to one or more of a first set of tagged recurring transactions, a second set of tagged transactions within a geographic location, a third set of tagged event-based transactions, a fourth set of tagged category-based transactions, a fifth set of tagged merchant type transactions, or a sixth set of tagged product-type transactions.

Clause 29. One or more non-transitory computer-readable media comprising computer-executable instructions that, when executed by one or more processors, cause a user device to perform operations, comprising:
    receiving, at the user device and from a service provider, transaction data associated with an account, the transaction data comprising a plurality of transaction records each associated with an individual transaction and a plurality of characteristics;
    associating one or more tags with individual transaction records of the plurality of transaction records based at least in part on a subset of characteristics of the plurality of characteristics associated with the individual transaction records;
    determining a plurality of suggested payment amounts for payment corresponding to an account balance of the account based at least in part on the individual transaction records associated with the one or more tags and account information associated with the account; and
    providing, for presentation at the user device, information that identifies one or more suggested payment amounts of the plurality of suggested payment amounts.

Clause 30. The one or more non-transitory computer-readable media of clause 29, wherein associating the one or more tags with the individual transaction records of the plurality of transaction records based at least in part on the subset of characteristics of the plurality of characteristics associated with the individual transaction records comprises:
    storing the plurality of transaction records on the user device;
    determining the one or more tags based at least in part on the subset of characteristics of the plurality of characteristics associated with the individual transaction records; and
    modifying the individual transaction records to include data representative of the one or more tags.

Clause 31. The one or more non-transitory computer-readable media of clause 29, wherein each transaction record of the plurality of transaction records is associated with a single transaction instrument.

Clause 32. The one or more non-transitory computer-readable media of clause 29, further comprising additional computer executable instructions that, when executed by the one or more processors, cause the user device to perform additional operations comprising receiving contextual information from a service that is local to the user device, and wherein associating the one or more tags comprises determining the one or more tags based at least in part on the contextual information.

Clause 33. The one or more non-transitory computer-readable media of clause 32, wherein the contextual information comprises at least one of location information, product information, or event information.

Clause 34. The one or more non-transitory computer-readable media of clause 32, wherein the service comprises a searching service configured to search user data stored across multiple applications on the user device.

Clause 35. The one or more non-transitory computer-readable media of clause 29, wherein providing the information that identifies the one or more suggested payment amounts of the plurality of suggested payment amounts comprises providing the information responsive to a user input that requests the information.

Clause 36. A user device, comprising:
    a display;
    a memory configured to store computer-executable instructions; and
    a processor configured to access the memory and execute the computer-executable instructions to at least:
        receive, from a service provider, transaction data associated with an account, the transaction data comprising a plurality of transaction records each associated with an individual transaction and a plurality of characteristics;
        associate one or more tags with individual transaction records of the plurality of transaction records based at least in part on a subset of characteristics of the plurality of characteristics associated with the individual transaction records;
        determine a plurality of suggested payment amounts for payment corresponding to an account balance of the account based at least in part on the individual transaction records associated with the one or more tags and account information associated with the account; and
        provide, for presentation at the user device, information that identifies one or more suggested payment amounts of the plurality of suggested payment amounts.

Clause 37. The user device of clause 36, wherein the processor is further configured to access the memory and execute additional computer-executable instructions to at least determine the one or more tags prior to associating the one or more tags with the individual transaction records.

Clause 38. The user device of clause 37, wherein determining the one or more tags comprises using a machine learning technique to identify associations between the plurality of transaction records.

Clause 39. The user device of clause 36, wherein at least one of the one or more tags is defined by a user of the user device.

Clause 40. The user device of clause 36, wherein the transaction data corresponds to a statement period, and wherein providing the information that identifies the one or more suggested payment amounts comprises providing a statement that includes the one or more suggested payment amounts.

Clause 41. A computer-implemented method, comprising:
  providing, for presentation at a display of a user device, one or more suggested search queries based at least in part on a plurality of transaction records, each suggested search query of the one or more suggested search queries representing one or more tags that have been associated with a set of transaction records of the plurality of transaction records;
  receiving, via an input component of the user device, a user input that selects a first suggested search query of the one or more suggested search queries;
  determining a particular set of transaction records of the plurality of transaction records based at least in part on at least one tag that is represented by the first suggested search query; and
  providing, for presentation at the display, transaction information associated with the particular set of transaction records.

Clause 42. The computer-implemented method of clause 41, wherein providing the transaction information for presentation comprises providing a category total that identifies a category associated with at least one transaction record of the particular set of transaction records and a category total amount associated with the category.

Clause 43. The computer-implemented method of clause 42, wherein the at least one tag comprises a category tag that identifies a type of good or service associated with an entity of the at least one transaction record.

Clause 44. The computer-implemented method of clause 41, wherein providing the transaction information for presentation comprises providing a transaction record list that includes the particular set of transaction records, and a transaction total amount associated with the particular set of transaction records.

Clause 45. The computer-implemented method of clause 41, wherein the user input is a first user input, the method further comprising:
  providing, for presentation at the display, an additional suggested search query based at least in part on a second user input;
  receiving, via the input component, a third user input that selects the additional suggested search query;
  determining a subset of transaction records of the particular set of transaction records based at least in part on at least one different tag that is represented by the additional suggested search query; and
  providing, for presentation at the display, updated transaction information associated with the subset of transaction records.

Clause 46. The computer-implemented method of clause 41, further comprising, prior to receiving the first user input, generating the one or more tags based at least in part on two or more characteristics of the set of transaction records.

Clause 47. The computer-implemented method of clause 46, further comprising modifying the set of transaction records to include the one or more tags.

Clause 48. The computer-implemented method of clause 41, wherein the user input is a first user input, the method further comprising receiving, via the input component, a second user input relating to a search query of the plurality of transaction records, and wherein providing the one or more suggested search queries comprises providing the one or more suggested search queries based at least in part on the second user input.

Clause 49. One or more non-transitory computer-readable media comprising computer-executable instructions that, when executed by one or more processors, cause a user device to perform operations, comprising:
  receiving, via an input component of a user device, a first user input relating to a search query of a plurality of transaction records;
  providing, for presentation at a display of the user device, one or more suggested search queries based at least in part on the first user input, each suggested search query of the one or more suggested search queries representing one or more tags that have been associated with a set of transaction records of the plurality of transaction records;
  receiving, via the input component of the user device, a second user input that selects a first suggested search query of the one or more suggested search queries;
  determining a particular set of transaction records of the plurality of transaction records based at least in part on at least one tag that is represented by the first suggested search query; and
  providing, for presentation at the display, transaction information associated with the particular set of transaction records.

Clause 50. The one or more non-transitory computer-readable media of clause 49, wherein determining the particular set of transaction records comprises conducting a search of the plurality of transaction records using the at least one tag as an index.

Clause 51. The one or more non-transitory computer-readable media of clause 49, further comprising additional computer executable instructions that, when executed by the one or more processors, cause the user device to perform additional operations comprising generating the one or more tags based at least in part on contextual information that is independent of the plurality of transaction records.

Clause 52. The one or more non-transitory computer-readable media of clause 49, wherein the transaction information individually identifies the particular set of transaction records and a grouping of at least some of the particular set of transaction records.

Clause 53. The one or more non-transitory computer-readable media of clause 49, wherein the plurality of transaction records is associated with a single transaction instrument, a plurality of transaction instruments, or a plurality of different transaction instruments.

Clause 54. The one or more non-transitory computer-readable media of clause 49, wherein providing the transaction information for presentation comprises providing a category total that identifies a category associated with at least one transaction record of the particular set of transaction records and a category total amount associated with the category.

Clause 55. The one or more non-transitory computer-readable media of clause 54, wherein the first user input comprises a selection of a particular application of the user device that accesses information associated with the plurality of transaction records.

Clause 56. A user device, comprising:
a display;
an input component;
a memory configured to store computer-executable instructions; and
a processor configured to access the memory and execute the computer-executable instructions to at least:
receive, via the input component, a first user input relating to a plurality of transaction records;
provide, for presentation at the display, one or more suggested search queries based at least in part on the first user input, each suggested search query of the one or more suggested search queries representing one or more tags that have been associated with a set of transaction records of the plurality of transaction records;
receive, via the input component, a second user input that selects a first suggested search query of the one or more suggested search queries;
determine a particular set of transaction records of the plurality of transaction records based at least in part on at least one tag that is represented by the first suggested search query; and
provide, for presentation at the display, transaction information associated with the particular set of transaction records.

Clause 57. The user device of clause 56, wherein the at least one tag comprises at least one of a threshold tag, a category tag, a recurring tag, an event tag, or a location tag.

Clause 58. The user device of clause 56, wherein determining the particular set of transaction records is further based at least in part on an additional tag that is represented by the first suggested search query.

Clause 59. The user device of clause 56, wherein the set of transaction records is stored in the memory of the user device.

Clause 60. The user device of clause 56, wherein determining the particular set of transaction records comprises conducting a search of the plurality of transaction records using the at least one tag as an index.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In examples utilizing a network server, the network server can run any of a variety of server or mid-tier applications, including HTTP servers, FTP servers, CGI servers, data servers, Java servers, and business application servers. The server(s) may also be capable of executing programs or scripts in response to requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®' and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable media for containing code, or portions of code, can include any appropriate media known or used in the art, including storage media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

As described above, one aspect of the present technology is the gathering and use of data available from various sources to provide a comprehensive and complete window to a user's spending habits. The present disclosure contemplates that in some instances, this gathered data may include personally identifiable information (PII) data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital sign measurements, medication information, exercise information), date of birth, health record data, or any other identifying or personal or health information.

The present disclosure recognizes that the use of such personal information data, in the present technology, can be used to the benefit of users. For example, the personal information data can be used to provide enhancements to a user's spending habits. Further, other uses for personal information data that benefit the user are also contemplated by the present disclosure. For instance, financial data may be used to provide insights into a user's general financial health, or may be used as positive feedback to individuals using technology to pursue financial health goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the U.S., collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services or other services relating to health record management, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer-implemented method, comprising:
providing, for presentation at a display of a user device, one or more suggested search queries corresponding to one or more tags assigned to a plurality of transaction records, the plurality of transaction records being stored on the user device, the one or more tags having been generated on the user device, each transaction record of the plurality of transaction records including transaction information for a corresponding transaction represented by the transaction record;
receiving, via an input component of the user device, a user input that selects a first suggested search query of the one or more suggested search queries;
determining a tag, of the one or more tags, corresponding to the first suggested search query;
determining a particular set of transaction records, of the plurality of transaction records, corresponding to the tag;
determining first transaction information from the particular set of transaction records, the first transaction information corresponding to the tag;
determining an additional tag assigned to at least one transaction record within the particular set of transaction records;
determining second transaction information from the at least one transaction record, the second transaction information corresponding to the additional tag;
identifying a first heading corresponding to the tag;
identifying a second heading corresponding to the additional tag; and
providing, for presentation within a user interface at the display:
the first heading and a portion of the first transaction information, the portion of the first transaction information to be presented within a first section of the user interface corresponding to the first heading; and
the second heading and a portion of the second transaction information, the portion of the second transaction information to be presented within a second section of the user interface corresponding to the second heading.

2. The computer-implemented method of claim 1, wherein providing the at least first heading and the portion of the first transaction information for presentation comprises providing a category total that identifies a category associated with at least one transaction record of the particular set of transaction records and a category total amount associated with the category.

3. The computer-implemented method of claim 2, wherein the tag comprises a category tag that identifies a type of good or service associated with an entity of the at least one transaction record.

4. The computer-implemented method of claim 1, wherein providing the first heading and the portion of the first transaction information for presentation comprises providing a transaction record list that includes the particular set of transaction records, and a transaction total amount associated with the particular set of transaction records.

5. The computer-implemented method of claim 1, wherein the user input is a first user input, the method further comprising:
providing, for presentation at the display, an additional suggested search query based at least in part on a second user input;
receiving, via the input component, a third user input that selects the additional suggested search query;
determining a subset of transaction records of the particular set of transaction records based at least in part on at least one different tag that is represented by the additional suggested search query; and
providing, for presentation at the display, updated transaction information associated with the subset of transaction records.

6. The computer-implemented method of claim 1, further comprising, prior to receiving the user input, generating the one or more tags based at least in part on two or more characteristics of at least a portion of the plurality of transaction records.

7. The computer-implemented method of claim 6, further comprising modifying the at least the portion of the plurality of transaction records to include the one or more tags.

8. One or more non-transitory computer-readable media comprising computer-executable instructions that, when executed by one or more processors, cause a user device to perform operations, comprising:
receiving, via an input component of a user device, a first user input relating to a search query of a plurality of transaction records;

providing, for presentation at a display of the user device, one or more suggested search queries based at least in part on the first user input, the one or more suggested search queries corresponding to one or more tags assigned to the plurality of transaction records, the plurality of transaction records being stored on the user device, the one or more tags having been generated on the user device, each transaction record of the plurality of transaction records including transaction information for a corresponding transaction represented by the transaction record;

receiving, via the input component of the user device, a second user input that selects a first suggested search query of the one or more suggested search queries;

determining a tag, of the one or more tags, corresponding to the first suggested search query;

determining a particular set of transaction records, of the plurality of transaction records, corresponding to the tag;

determining first transaction information from the particular set of transaction records, the first transaction information corresponding to the tag;

determining an additional tag assigned to at least one transaction record within the particular set of transaction records;

determining second transaction information from the at least one transaction record, the second transaction information corresponding to the additional tag;

identifying a first heading corresponding to the tag;

identifying a second heading corresponding to the additional tag; and providing, for presentation within a user interface at the display:
the first heading and a portion of the first transaction information, the portion of the first transaction information to be presented within a first section of the user interface corresponding to the first heading; and
the second heading and a portion of the second transaction information, the portion of the second transaction information to be presented within a second section of the user interface corresponding to the second heading.

9. The one or more non-transitory computer-readable media of claim 8, wherein determining the particular set of transaction records comprises conducting a search of the plurality of transaction records using the tag as an index.

10. The one or more non-transitory computer-readable media of claim 8, further comprising additional computer executable instructions that, when executed by the one or more processors, cause the user device to perform additional operations comprising generating the one or more tags based at least in part on contextual information that is independent of the plurality of transaction records.

11. The one or more non-transitory computer-readable media of claim 8, wherein the transaction information individually identifies the particular set of transaction records and a grouping of at least some of the particular set of transaction records.

12. The one or more non-transitory computer-readable media of claim 8, wherein the plurality of transaction records is associated with a single transaction instrument, a plurality of transaction instruments, or a plurality of different transaction instruments.

13. The one or more non-transitory computer-readable media of claim 8, wherein providing the first heading and the portion of the first transaction information for presentation comprises providing a category total that identifies a category associated with at least one transaction record of the particular set of transaction records and a category total amount associated with the category.

14. The one or more non-transitory computer-readable media of claim 13, wherein the first user input comprises a selection of a particular application of the user device that accesses information associated with the plurality of transaction records.

15. A user device, comprising:
a display;
an input component;
a memory configured to store computer-executable instructions; and
a processor configured to access the memory and execute the computer-executable instructions to at least:
receive, via the input component, a first user input relating to a plurality of transaction records;
provide, for presentation at the display, one or more suggested search queries based at least in part on the first user input, the one or more suggested search queries corresponding to one or more tags assigned to the plurality of transaction records, the plurality of transaction records being stored in the memory of the user device, the one or more tags having been generated on the user device, each transaction record of the plurality of transaction records including transaction information for a corresponding transaction represented by the transaction record;
receive, via the input component, a second user input that selects a first suggested search query of the one or more suggested search queries;
determine a tag, of the one or more tags, corresponding to the first suggested search query;
determine a particular set of transaction records, of the plurality of transaction records, corresponding to the tag;
determine first transaction information from the particular set of transaction records, the first transaction information corresponding to the tag;
determine an additional tag assigned to at least one transaction record within the particular set of transaction records;
determine second transaction information from the at least one transaction record, the second transaction information corresponding to the additional tag;
identify a first heading corresponding to the tag;
identify a second heading corresponding to the additional tag; and
provide, for presentation within a user interface at the display:
the first heading and a portion of the first transaction information, the portion of the first transaction information to be presented within a first section of the user interface corresponding to the first heading; and
the second heading and a portion of the second transaction information, the portion of the second transaction information to be presented within a second section of the user interface corresponding to the second heading.

16. The user device of claim 15, wherein the tag comprises a threshold tag, a category tag, a recurring tag, an event tag, or a location tag.

17. The user device of claim 15, wherein the particular set of transaction records is determined further based at least in part on an additional tag that is represented by the first suggested search query.

18. The user device of claim 15, wherein to determine the particular set of transaction records comprises to conduct a search of the plurality of transaction records using the tag as an index.

19. The computer-implemented method of claim 1, wherein:
- the portion of the first transaction information is to be presented as a first list in the first section of the user interface; and
- the portion of the second transaction information is to be presented in a second list in the second section of the user interface.

20. The computer-implemented method of claim 1, wherein the portion of the first transaction information includes recent transactions corresponding to the tag.

* * * * *

UNITED STATES PATENT AND TRADEMARK OFFICE
CERTIFICATE OF CORRECTION

Page 1 of 1

PATENT NO. : 12,505,130 B2
APPLICATION NO. : 17/939627
DATED : December 23, 2025
INVENTOR(S) : Michael A. Minar et al.

It is certified that error appears in the above-identified patent and that said Letters Patent is hereby corrected as shown below:

In the Claims

Column 44, Claim 2, Line 22: delete "at least".

Signed and Sealed this
Tenth Day of February, 2026

John A. Squires
*Director of the United States Patent and Trademark Office*